(12) United States Patent
Ghosh Dastidar

(10) Patent No.: US 9,319,374 B2
(45) Date of Patent: Apr. 19, 2016

(54) PERSONALIZED BOOKMARKING OF TEXTSITE APPLICATIONS VIA A TEXT MESSAGE

(71) Applicant: Aritra Ghosh Dastidar, Bangalore (IN)

(72) Inventor: Aritra Ghosh Dastidar, Bangalore (IN)

(73) Assignee: Intuit Inc., Mountain View, CA (US)

( * ) Notice: Subject to any disclaimer, the term of this patent is extended or adjusted under 35 U.S.C. 154(b) by 401 days.

(21) Appl. No.: 14/025,731

(22) Filed: Sep. 12, 2013

(65) Prior Publication Data

US 2015/0067074 A1 Mar. 5, 2015

(30) Foreign Application Priority Data

Aug. 29, 2013 (IN) .......................... 1002/KOL/2013

(51) Int. Cl.
*H04L 12/58* (2006.01)
(52) U.S. Cl.
CPC ................ *H04L 51/38* (2013.01); *H04L 51/18* (2013.01)
(58) Field of Classification Search
None
See application file for complete search history.

(56) References Cited

U.S. PATENT DOCUMENTS

| 2007/0293247 | A1* | 12/2007 | Bhat | ................. | G06F 17/30867 |
| | | | | | 455/466 |
| 2010/0062745 | A1* | 3/2010 | Silk | ........................ | G06Q 10/10 |
| | | | | | 455/411 |
| 2010/0228622 | A1* | 9/2010 | Vijayakrishnan | ...... | G06Q 30/02 |
| | | | | | 705/14.44 |
| 2011/0230213 | A1* | 9/2011 | Shah | .................... | H04L 12/5895 |
| | | | | | 455/466 |
| 2011/0230214 | A1* | 9/2011 | Shah | ....................... | H04W 4/18 |
| | | | | | 455/466 |
| 2012/0042021 | A1* | 2/2012 | Shah | ................... | H04L 12/5895 |
| | | | | | 709/206 |
| 2013/0143611 | A1* | 6/2013 | Nambiar | ................. | H04W 4/14 |
| | | | | | 455/466 |
| 2013/0144942 | A1* | 6/2013 | Nambiar | ................. | H04L 67/42 |
| | | | | | 709/203 |
| 2013/0282750 | A1* | 10/2013 | Paul | .................. | G06F 17/30675 |
| | | | | | 707/767 |

\* cited by examiner

*Primary Examiner* — Natisha Cox
(74) *Attorney, Agent, or Firm* — Osha Liang LLP

(57) ABSTRACT

A method for using a bookmark to access content from a global textsite platform (GTP). The method includes obtaining a bookmark creating text message, wherein the bookmark creating text message is based on a text messaging service (TMS) and sent by a user to create the bookmark, extracting, by a computer processor from the bookmark creating text message and based on a pre-determined syntax, a user ID representing the user, a first bookmark ID representing the bookmark, and a first registered unique keyword used to access a first textsite from the GTP based on the TMS, and storing, as a bookmark entry in a bookmark list of the GTP, the user ID, the first bookmark ID, and the first registered unique keyword, wherein the first bookmark ID is used by the user to access the first textsite from the GTP.

24 Claims, 16 Drawing Sheets

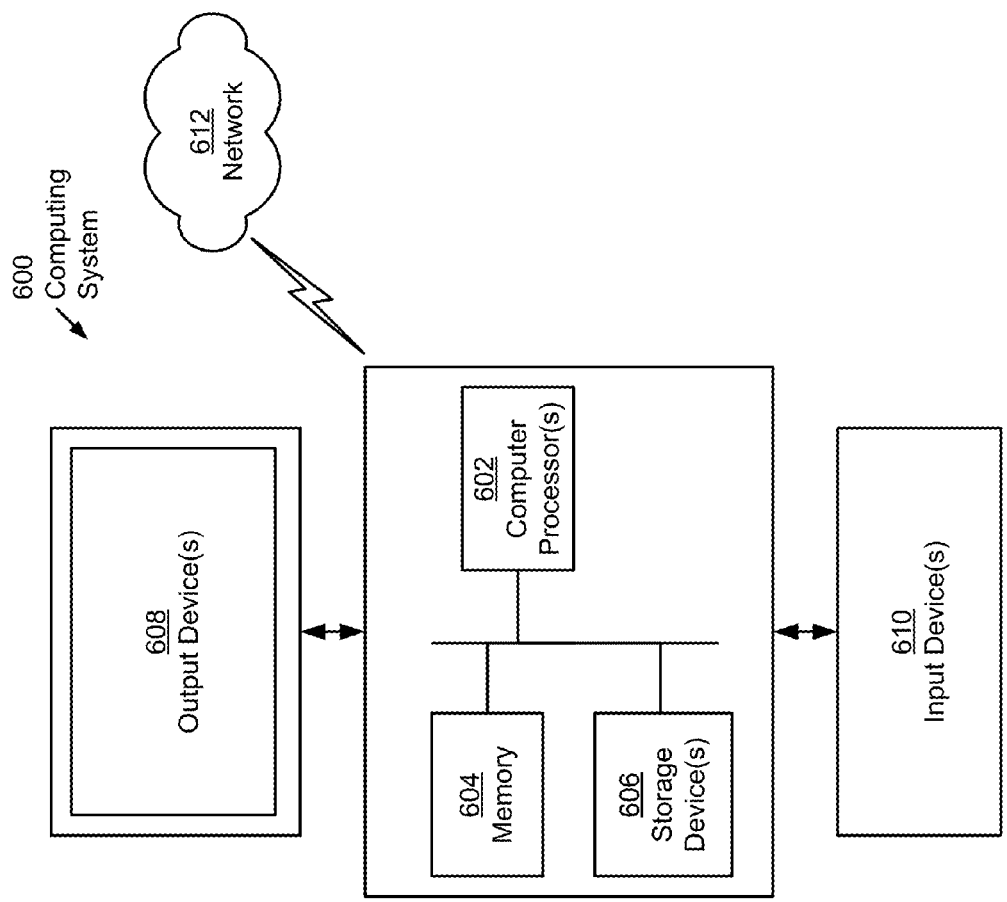

US 9,319,374 B2

PERSONALIZED BOOKMARKING OF TEXTSITE APPLICATIONS VIA A TEXT MESSAGE

CROSS-REFERENCE TO RELATED APPLICATIONS

This application claims priority, under 35 U.S.C. §119(a), to Indian Patent Application No. 1002/KOL/2013, filed on Aug. 29, 2013, and entitled: "PERSONALIZED BOOKMARKING OF TEXTSITE APPLICATIONS VIA A TEXT MESSAGE".

BACKGROUND

Today's mobile devices, such as smart phones, allow users to browse the Internet from any location to obtain information on demand. As long as a user is in an area with the proper telecommunication network and subscribes to a data plan, the user is provided with access to the Internet for web browsing to obtain information such as phone numbers for services, map out a particular destination location, and obtain information relevant to the user's current or next activity. However, there are often instances in which a user wishes to access only limited information for a quick answer to a question (e.g., what are the next available show times for a particular movie?). In this scenario, browsing the website for the movie theater or a service provider website that provides movie show times may be cumbersome on the mobile device. Specifically, loading all the graphics and advertisements associated with websites on a mobile device can take additional time. In other words, the entire website may provide too much data to navigate through when a user desires only a specific piece of information. In addition, for mobile device users who do not subscribe to a data plan for browsing the Internet, are in an area without the proper telecommunication network, or do not have browsing capability on their mobile device, accessing such information on demand is not possible.

As an alternative, information content similar to what is available via the Internet may be provided by a text messaging service (TMS) based platform. For example, the user may request desired information by sending a registered keyword via a TMS message to the TMS based platform. The registered keyword identifies such user requested information and is registered with the TMS based platform by an information publisher. As additional information is published in the TMS based platform, the registered keyword collection grows in size and the user needs an effective discovery mechanism to find new keyword that identifies published information of interest to the user.

SUMMARY

In general, in one aspect, the invention relates to a method for using a bookmark to access content from a global textsite platform (GTP). The method includes obtaining a bookmark creating text message, wherein the bookmark creating text message is based on a text messaging service (TMS) and sent by a user to create the bookmark, extracting, by a computer processor from the bookmark creating text message and based on a pre-determined syntax, a user ID representing the user, a first bookmark ID representing the bookmark, and a first registered unique keyword used to access a first textsite from the GTP based on the TMS, and storing, as a bookmark entry in a bookmark list of the GTP, the user ID, the first bookmark ID, and the first registered unique keyword, wherein the first bookmark ID is used by the user to access the first textsite from the GTP.

In general, in one aspect, the invention relates to a system for using a bookmark to access content from a global textsite platform (GTP). The system includes a processor, memory storing instructions executable by the processor, wherein the instructions comprise (i) a message analyzer configured to obtain a bookmark creating text message, wherein the bookmark creating text message is based on a text messaging service (TMS) and sent by a user to create the bookmark, and extract, from the bookmark creating text message and based on a pre-determined syntax, a user ID representing the user, a first bookmark ID representing the bookmark, and a first registered unique keyword used to access a first textsite from the GTP based on the TMS, (ii) a bookmark manager configured to store, as a bookmark entry in a bookmark list of the GTP, the user ID, the first bookmark ID, and the first registered unique keyword, and (iii) a repository for storing the bookmark list, wherein the first bookmark ID is used by the user to access the first textsite from the GTP.

In general, in one aspect, the invention relates to a non-transitory computer readable storage medium storing software instructions for using a bookmark to access content from a global textsite platform (GTP). The software instructions when executed include functionality for obtaining a bookmark creating text message, wherein the bookmark creating text message is based on a text messaging service (TMS) and sent by a user to create the bookmark, extracting, from the bookmark creating text message and based on a pre-determined syntax, a user ID representing the user, a first bookmark ID representing the bookmark, and a first registered unique keyword used to access a first textsite from the GTP based on the TMS, and storing, as a bookmark entry in a bookmark list of the GTP, the user ID, the first bookmark ID, and the first registered unique keyword, wherein the first bookmark ID is used by the user to access the first textsite from the GTP.

Other aspects of the invention will be apparent from the following description and the appended claims.

BRIEF DESCRIPTION OF DRAWINGS

FIG. 5 shows a computer system in accordance with one or more embodiments of the invention.

DETAILED DESCRIPTION

Figure 1A:
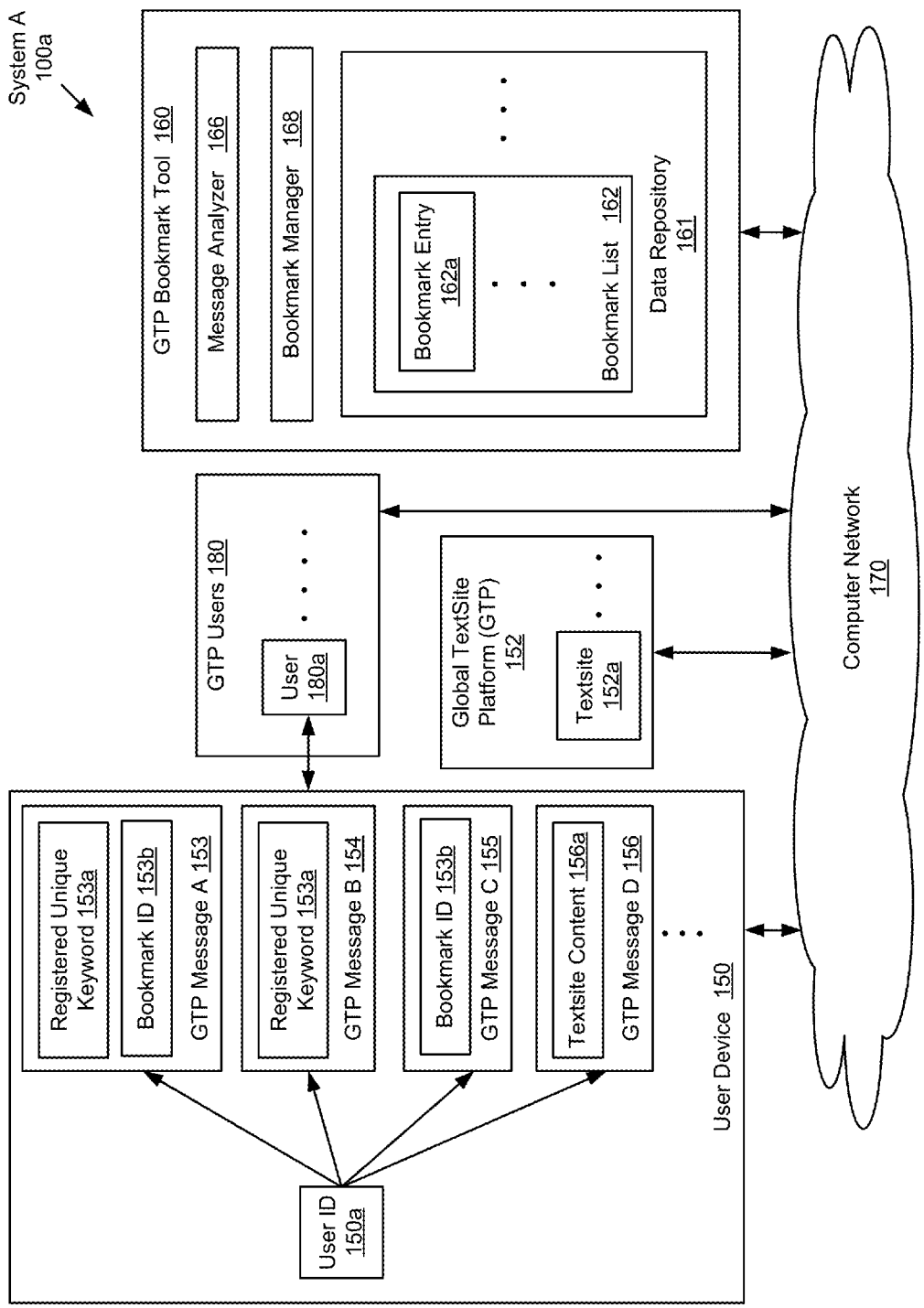
FIGS. 1A and 1B show block diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for a user of a text messaging service (TMS) based content platform to use bookmarks for accessing content provided by the TMS based content platform. In other words, embodiments of the invention provide a mechanism for bookmarking registered keywords identifying published information in the TMS based content platform that may be of interest to the user.

In one or more embodiments, the TMS based content platform is a global textsite platform (GTP) providing published information as one or more textsites. Each textsite (also referred to as an application of the GTP) is accessible by the user sending a publisher registered keyword via a text message to the GTP. Each publisher registered keyword uniquely identifies one textsite (i.e., application) within the GTP and is also referred to as the application name of the application. The GTP and accessing the textsites using corresponding publisher registered keywords are described in detail throughout this disclosure. Throughout this disclosure, the terms "textsite," "application," and "textsite application" may be used interchangeably depending on the context. Further, the terms "publisher registered keyword," "registered keyword," "registered unique keyword," and "application name" may also be used interchangeably depending on the context. Accordingly, accessing the textsites using corresponding registered unique keywords is also referred to as accessing the applications using corresponding application names.

Textsite users often have low memory retention about the registered keywords for various textsites. Quite frequently, a new or even existing user may have difficulty in texting the correct keyword to access a desired textsite application. For example, the user may have typographical errors when texting keywords, resulting in a long process to search for the correct spelling or the right keyword for the desired textsite. In one or more embodiments, the bookmarking mechanism allows a user to request the GTP to memorize or store application names as a personalized list (referred to the bookmark list) of easy to remember bookmark IDs. Each Bookmark ID may be any text string that the user assigns to a corresponding application name. In one or more embodiments, the bookmarking mechanism also allows the GTP to cross-promote selected textsite applications by pre-filling the bookmark list for a user, thereby creating a revenue source for the business entity operating the GTP. Throughout this disclosure, the term "bookmark" may refer to, depending on the context, the association of a bookmark ID to the assigned application name/registered unique keyword or refer to an entry storing such association in the bookmark list.

FIG. 1A shows a block diagram of a system A (100*a*) for personalized bookmarking of textsite applications via a text message in accordance with one or more embodiments of the invention. Specifically, the system A (100*a*) includes a user device (150) used by a user (180*a*), a global textsite platform (GTP) (152) (i.e., the TMS based content platform) used by GTP users (180), and a GTP bookmark tool (160) coupled via a computer network (170). In one or more embodiments of the invention, content provided by the GTP (152) may be organized/published as the aforementioned textsites, such as the textsite (152*a*). In one or more embodiments of the invention, the GTP bookmark tool (160), or a portion thereof, may be integrated with the GTP (152). In one or more embodiments of the invention, one or more of the modules and elements shown in FIG. 1A may be omitted, repeated, and/or substituted. Accordingly, embodiments of the invention should not be considered limited to the specific arrangements of modules shown in FIG. 1A.

In one or more embodiments of the invention, the computer network (170) may include a cellular phone network, a wide area network, a local area network, a public switched telephone network (PSTN), or any other suitable network that facilitates the exchange of messages from one part of the network to another. In one or more embodiments, the computer network (170) is coupled to or overlap with the Internet. In one or more embodiments, each of the user device (150), the GTP (152), and the GTP bookmark tool (160) may include any computing device configured with computing, data storage, and network communication functionalities. Generally, the GTP (152) is configured with high performance computing capability and large amount of data storage capacity to support multiple user devices (e.g., user device (150)) in a client server application environment. In one or more embodiments, the user device (150) may be a mobile device, such as a cellular phone or a smartphone used by the user (180*a*) (e.g., a person as one of the many users included in the GTP users (180)) to exchange TMS messages (e.g., GTP message A (153), GTP message B (154), GTP message C (155), GTP message D (156), etc.) with the GTP (152). For example, the TMS messages may be based on SMS (i.e., Simple Messaging Service), MMS (i.e., multimedia messaging service), other text messaging service known to those skilled in the art, or any text messaging service that may be developed in the future. In one or more embodiments, these GTP messages are tagged/inserted with the user ID (150*a*) identifying the user (180*a*) and/or the user device (150). Detailed examples of the GTP (152), user device (150), and various GTP messages are described in reference to FIGS. 1B, 2B, and FIGS. 3A-4E below.

In one or more embodiments of the invention, the GTP bookmark tool (160) includes a message analyzer (166), a bookmark manager (168), and a data repository (161). In one or more embodiments, the data repository (161) may be any datastore (flat file, hierarchical file, relational database, object-oriented database, etc.) capable of storing data collected, generated, used or otherwise accessed by the message analyzer (166) and the bookmark manager (168). As shown in FIG. 1A, the data repository (161) stores one or more bookmark lists, such as the bookmark list (162) having one or more bookmark entries (e.g., bookmark entry (162*a*)). In one or more embodiments, the bookmark list (162) may include a number of default bookmark entries corresponding to frequently used textsites for the GTP users (180). In one or more embodiments, the bookmark list (162) may not include any default bookmark entry and requires a user (e.g., user (180*a*)) to create his/her own bookmark entries. In one or more embodiments, the bookmark list (162) may be a list, file, linked list, or other suitable data structure. The data repository (161) may include a disk drive storage device, a semiconductor storage device, other suitable computer data storage device, or combinations thereof.

In one or more embodiments of the invention, the message analyzer (166) is configured to obtain a bookmark creating text message, such as the GTP message A (153). In particular, the GTP message A (153) is sent by the user (180*a*) to create a bookmark for accessing content from the GTP (152). In one or more embodiments, the bookmark creating text message has a pre-determined syntax to define how to assign a bookmark ID (e.g., bookmark ID (153*b*)) to represent a registered unique keyword (e.g., registered unique keyword (153*a*)) that identifies requested content from the GTP (152). For example, the GTP message A (153) may include the bookmark ID (153*b*) immediately preceding the registered unique keyword (153a) according to the pre-determined syntax. In one or more embodiments, the message analyzer (166) detects any outgoing GTP messages sent by the user (180a) that conforms to the pre-determined syntax as a bookmark creating text message. For example, when the message analyzer (166) detects that the GTP message A (153) conforms to the bookmark creating text message syntax, the GTP message A (153) is identified as a bookmark creating text message. In response, the message analyzer (166) is further configured to extract, from the GTP message A (153) based on the pre-determined syntax, the user ID (150a) representing the user (180a), the bookmark ID (153b) representing the bookmark to be created, and the registered unique keyword (153a) used to access the textsite (152a) from the GTP (152). In one or more embodiments, the user ID (150a) includes a mobile phone number or other identifier of the user device (150). For example, the user ID may be embedded in a header of the GTP message A (153) instead of the content of the GTP message A (153). In another example, the user ID may be explicitly inserted into the content of the GTP message A (153).

In one or more embodiments of the invention, the bookmark manager (168) is configured to store, in the bookmark entry (162a), the extracted user ID (150a) of the user (180a), the bookmark ID (153b), and the registered unique keyword (153a). For example, the bookmark manager (168) may create the bookmark entry (162a) in response to the message analyzer (166) identifying the GTP message A (153) as a bookmark creating message based on the pre-determined syntax. Once the bookmark entry (162a) is created and completed, the bookmark ID (153b) is used by the user (180a), as an alternative to using the registered unique keyword (153a), to access the textsite (152a) from the GTP (152). In one or more embodiments, the aforementioned default bookmark entries include system assigned bookmark IDs, such as a sequence of alphanumeric characters corresponding to a pre-determined list of frequently accessed textsites.

In general, the GTP (152) returns requested content in response to content access text messages from GTP users (180). For example, the content access text messages may include the GTP message B (154) or the GTP message C (155) sent by the user (180a) via the user device (150). As shown in FIG. 1A, the GTP message B (154) specifies the requested content by including the registered unique keyword (153a), which is registered by a publisher for identifying the textsite (152a). Alternatively, the GTP message C (155) specifies the requested content by including the bookmark ID (153b), which is assigned by the user (180a) to represent the registered unique keyword (153a), as described above. Typically, the bookmark ID (153b) is a short-hand representation of the registered unique keyword (153a) such that the user (180a) may more readily remember the bookmark ID (153b) than the registered unique keyword (153a).

In one or more embodiments, the GTP message B (154) or GTP message C (155) specifies the requested content by including the registered unique keyword (153a) or bookmark ID (153b), respectively, according to a pre-defined syntax. If the GTP message B (154) is sent by the user (180a), the GTP (152) analyzes the GTP message B (154) based on the pre-defined syntax to directly determine that the requested content is available in the textsite (152a). For example, the GTP message B (154) may be compared to a list of registered unique keywords where a match is found with respect to the textsite (152a). If the GTP message C (155) is sent by the user (180a), the GTP (152) identifies the GTP message C (155) as containing a bookmark by comparing the GTP message C (155) to the bookmark list (162) where a match is found with respect to the bookmark entry (162a) containing the bookmark ID (153b) and the user ID (150a) of the user (180a). In response, the GTP (152) retrieves, based on the user ID (150a) and the bookmark ID (153b), the registered unique keyword (153a) from the bookmark entry (162a). Accordingly, the GTP (152) further retrieves, using the registered unique keyword (153a), requested content from the textsite (152a) for sending to the user (180a). For example, the requested content is embedded as textsite content (156a) in the GTP message D (156) that is received by the user (180a) via the user device (150).

Although the description above relates to sending the bookmark creating text message (e.g., GTP message A (153)) and the content access text message (e.g., GTP message C (155)) using a single user device, in one or more embodiments, the bookmark creating text message and the content access text message may be sent using different user devices. For example, the bookmark creating text message may be sent using an office computer of the user (180a), while the content access text message may be sent using a smartphone of the user (180a), and vice versa.

In one or more embodiments of the invention, the message analyzer (166) and the bookmark manager (168) are further configured to allow the user (180a) to review and/or update the bookmark list (162) and the bookmark entry (162a). Details of reviewing and/or updating the bookmark list (162) and the bookmark entry (162a) are described in reference to FIG. 2A below. In addition, detailed examples of creating the bookmark ID (153b) to represent the registered unique keyword (153a) and using the bookmark ID (153b) in place of the registered unique keyword (153a) to access the textsite content (152a), as well as reviewing/updating the bookmark list (162) and the bookmark entry (162a) are described in reference to FIGS. 4A-4C below.

Figure 1B:
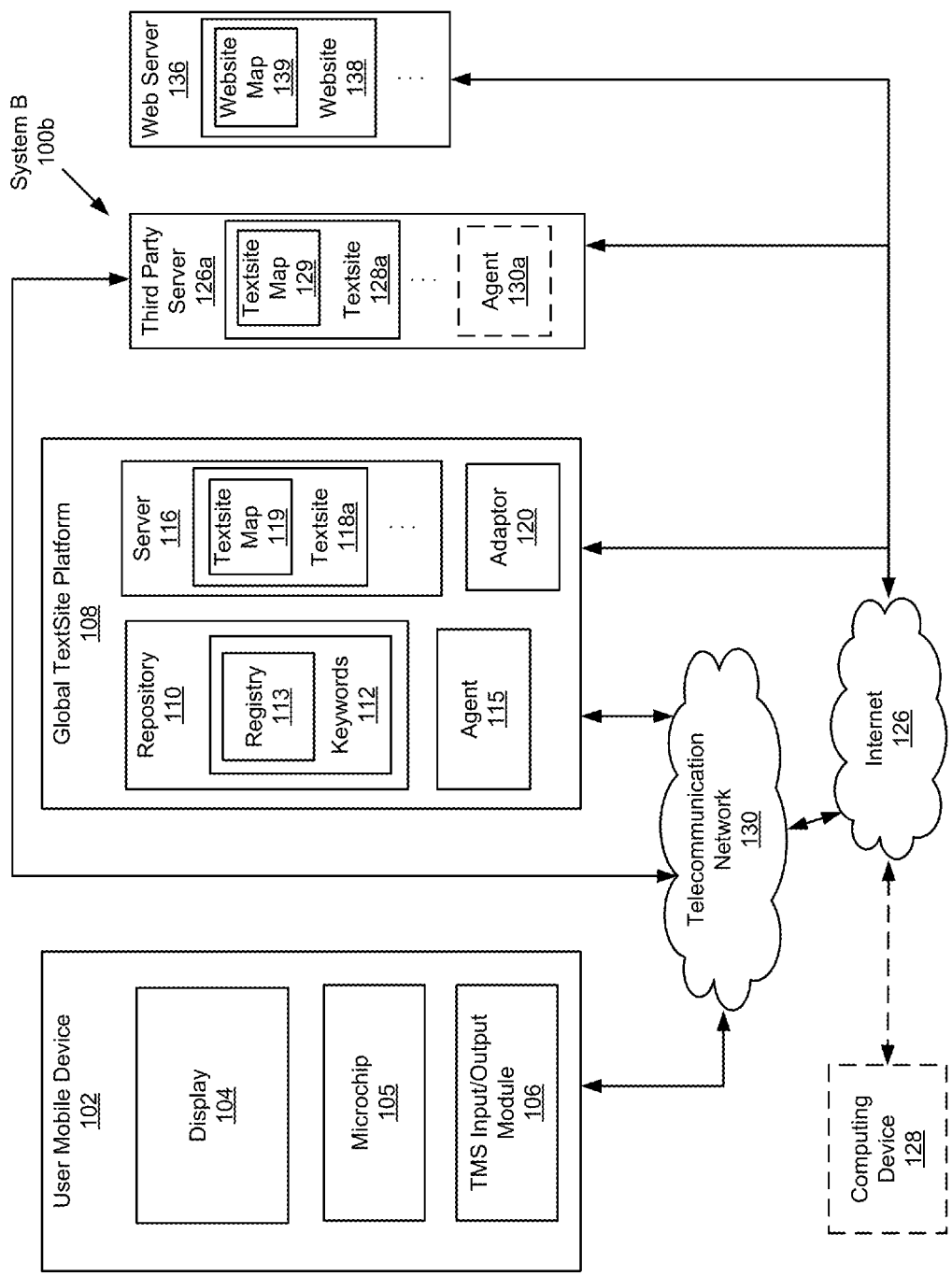

FIG. 1B shows a block diagram of a system (100b) for accessing content from a textsite in accordance with one or more embodiments of the invention. Specifically, FIG. 1B shows the global textsite platform (GTP) (108), a user mobile device (102), and a computing device (128) coupled via the telecommunication network (130) and/or the Internet (126). In one or more embodiments of the invention, the system (100b) is an example of the system (100a) depicted in FIG. 1A above. In one or more embodiments, the user mobile device (102) and the GTP (108) are examples of the user device (150) and the GTP (152), respectively, depicted in FIG. 1A above. In one or more embodiments of the invention, one or more of the modules and elements shown in FIG. 1B may be omitted, repeated, and/or substituted. Accordingly, embodiments of the invention should not be considered limited to the specific arrangements of modules shown in FIG. 1B.

In one or more embodiments of the invention, the global textsite platform (108) executes on one or more computing device(s) (e.g., a server, a computer system as shown in FIG. 5 and described below, etc.) and may be hosted by an entity, such as a corporation. In one or more embodiments of the invention, the global textsite platform (108) is associated with a platform syntax that is specific to the global textsite platform (108) and facilitates communication via a TMS. In one or more embodiments of the invention, the global textsite platform (108) may be associated with different unique phone numbers or codes corresponding to each different geographic location. Alternatively, a single, unique global number/code may be associated with the global textsite platform (108). In one or more embodiments of the invention, the global textsite platform (108) includes a repository (110) for storing keywords (112), a server (116) configured to host a plurality of textsites (e.g., textsite (118a)), an agent (115), and an adaptor (120). Those skilled in the art will appreciate that the server (116) may be any computing device with a large storage capacity.

The repository (110) may be any datastore (flat file, hierarchical file, relational database, enterprise-wide database, etc.) capable of storing data, regardless where or in what form the data originates. Keywords (112) may be reserved or pre-designated keywords maintained by the platform as part of the platform syntax, and publisher keywords that are registered by publishers for each textsite authored by a publisher. In one or more embodiments of the invention, pre-designated keywords and publisher registered keywords are unique. That is, no two keywords from the group of keywords that are pre-designated as platform syntax or the group of keywords provided by a publisher are allowed to be identical. In fact, in one or more embodiments of the invention, the keywords (112) are closely controlled by the global textsite platform (108) in an effort to eliminate duplicates. Navigating keywords, which a publisher defines for a textsite that is associated with a unique registered keyword, are also used. Navigating keywords are not required to be unique. For example, two distinct publishers with distinct registered keywords representing a first and a second textsite may use the same navigating keyword for different text pages associated with the first and second textsites.

In one or more embodiments, a portion of the keywords (112) is organized as a registry (113) storing a number of registered unique keywords each used as a site identifier and associated with metadata describing a mechanism for accessing corresponding site content, such as content stored in the textsite (118a), etc. In one or more embodiments, the registered unique keywords (i.e., used as site identifiers) are registered by textsite content publishers with relevant information processed into associated metadata. In one or more embodiments, the textsite (118a) may be hosted by the global textsite platform (108) on behalf of a first publisher or may be an in-house textsite maintained by the global textsite platform (108). In such embodiments, the metadata associated with the registered unique keyword (i.e., used as site identifiers) includes an internal link to the textsite (118a) within the global textsite platform (108).

In one or more embodiments, the textsite (128a) is published by a second publisher that has registered with the global textsite platform (108) but is hosted on a separate third party server (126a). In such embodiments, the metadata associated with the registered unique keyword (i.e., used as site identifier) includes an access path for the global textsite platform (108) to access the third party server (126a) via the telecommunication network (130) and/or the Internet (126). In one or more embodiments, the third party server (126a) may include agent (130a) configured with similar functionalities as those of the agent (115). For example, the agent (130a) may be provided to an operator of the third party server (126a) by an operator of the GTP (108) under a pre-determined business agreement (e.g., a licensing agreement).

In one or more embodiments, contents of the website (138) are converted by the global textsite platform (108) to be accessible to a user via TMS. In such embodiments, the metadata associated with the registered unique keyword includes an access path for the global textsite platform (108) to access the web server (136) via the Internet (126) and identifies whether the contents of the website (138), or a portion thereof, are converted dynamically (i.e., on demand) or statically (i.e., pre-converted and stored).

Generally, a publisher may be any person or entity that publishes information/content of a textsite (e.g., textsite (118a)) for users to access via a text messaging service or other network service. More specifically, a publisher may be any developer or service provider that provides a service or a product for users. For example, a publisher may be a restaurant owner that creates a textsite to provide information about his/her restaurant.

In one or more embodiments, a user is defined as a person or entity accessing content published by publishers and registered with the global textsite platform (108). As noted above, the published and registered content may be hosted by the global textsite platform (108). In one or more embodiments, a user is a person or entity with a mobile device that does not have a data plan subscription. Rather, the user is able to obtain data using the mobile device only via a TMS. That is, embodiments of the invention pertain specifically to users accessing content only via a TMS. Those skilled in the art will appreciate, however, that although embodiments of the invention target users that communicate via a TMS, the invention is not limited to such users. Specifically, while embodiments of the invention are directed to providing access to textsites to users using a mobile phone via a TMS, some users may be provided with the capability to access content on the global textsite platform (108) via a computing device (128), such as a desktop computer, a laptop computer, a thin computer, a combination thereof, or any other suitable electronic computing device that is capable of connecting to the global textsite platform (108) via the Internet (126). For example, in one or more embodiments, a user may use a text message emulator executing on the computing device (128) to connect to the global textsite platform (108) via the Internet (126). Alternatively, users with smart phones and/or mobile devices that support Internet browsing functionality could access content on the global textsite platform (108) using the Internet (126).

Further as shown in FIG. 1B, a user may possess the user mobile device (102) that is communicatively coupled to the global textsite platform (108) via the telecommunication network (130) and the Internet (126). The user mobile device (102) includes a display (104), a microchip (105), and a TMS input/output module (106). The user mobile device (102) may be any mobile device, such as a Code Division Multiple Access (CDMA) device, a global system mobile (GSM) device, a 3G device, a 4G device, a smart phone, a tablet, a pad device, a gaming device, a personal digital assistant, or any other suitable mobile device that includes text messaging functionality. In one or more embodiments of the invention, the user mobile device (102) is operatively connected to a global textsite platform (108) via a telecommunication network (130). The telecommunication network (130) may be any network that facilitates the exchange of messages from one part of the network to another. For example, the telecommunication network (130) may be a wide area network, a local area network, a public switched telephone network (PSTN), or any other suitable network for exchanging messages between the global textsite platform (108) and the user mobile device (102).

The display (104) of the user mobile device (102) may be a display screen using technology such as liquid crystal display (LCD), a light emitting diode (LED), organic light emitting diode (OLED), or any other suitable type of display screen capable of displaying the content of received text messages and the content of a text message that is being composed on the user mobile device (102). The microchip (105) may be any tangible hardware processor(s) or microprocessor(s) for executing the functionalities of the user mobile device (102). More specifically, the microchip (105) executes the software application(s) that provide functionalities such as browsing, text messaging, maintaining a contact list and making phone calls, etc. The TMS input/output module (106) may be a virtual keyboard, a physical keyboard, or any other input/output device(s) or button(s) that allows the publisher to compose text messages and receive and read text message responses.

In the user system (100b) of FIG. 1B, the global textsite platform (108) is configured to receive a text message from the user mobile device (102) that includes a request to access a textsite hosted by the global textsite platform (108). Further, the global textsite platform (108) is configured to process the request received from the user mobile device (102), and to provide the content from the desired textsite to the user's mobile device (102) via a TMS.

To facilitate this interaction with a user mobile device (102), the global textsite platform (108) includes an agent (115). In one or more embodiments of the invention, the agent (115) may be software that is the component of the global textsite platform (108), which communicates with a user mobile device (102). Specifically, the agent (115) is configured with functionality to receive a text message (i.e., a user message) from a user mobile device (102), parse the text message for the relevant keywords or platform-specific syntax, and respond to the user request by identifying and retrieving the content from the requested textsite/converted website for delivering back to the user mobile device (102) in accordance with one or more embodiments of the invention. In one or more embodiments, the content is delivered to the user mobile device (102) in a text message sent from the global textsite platform (i.e., a GTP message).

In one or more embodiments of the invention, the agent (115) is configured to identify, based on the registry (113), a registered unique keyword (i.e., used as site identifier) in the user message as a request to access the textsite (118a) hosted on the global textsite platform (108) or the textsite (128a) hosted on the third party server (126a). Accordingly, the agent (115) is configured to access the textsite (118a) or the textsite (128a) using the aforementioned access path included in the associated metadata. In one or more embodiments, the agent (115) is configured to exchange text messages with the user mobile device (102) for navigating a text page hierarchy of the textsite (118a) or the textsite (128a). In one or more embodiments, the textsite (118a) and the textsite (128a) include textsite map (119) and textsite map (129), respectively, that describe the hierarchical relationships of text pages contained within each textsite (118a, 128). For example, the textsite map (119) and the textsite map (129) may each include a data structure (e.g., graph, tree, linked list, file, database, etc.) containing navigating keywords defined by the respective publisher. Generally speaking, navigating keyword information (e.g., access information such as location, address, or other information enabling access to a text page pointed to by a navigating keyword) and navigation paths among text pages in the textsite (e.g., textsite (118a)) are stored in the textsite map (e.g., textsite map (129)). Specifically, a navigation path leads from one text page to another via intervening text pages accessed using the navigating keywords contained in each of the text pages traversed along the navigation path. More details of navigating a textsite, for example based on the textsite map, by exchanging text messages between the agent (115) and the user mobile device (102), are described in reference to FIGS. 3A, 3B, 3C, 3D, 3F, 3G, 3H, 3I, and 3J below.

In one or more embodiments of the invention, the agent (115) is configured to identify, based on the registry (113), a registered unique keyword (i.e., used as site identifier) in the user message as a request to access the website (138) hosted on the web server (136). For example, such registered unique keyword may be registered by a publisher of an adaptor plug-in that maps the website map (139) into a global textsite platform syntax suitable for the adaptor (120) to convert contents of the website (138). Accordingly, the agent (115) is configured to activate the adaptor (120) for accessing the website (138) using the aforementioned access path included in the associated metadata. In one or more embodiments, the agent (115) is configured to exchange text messages with the user mobile device (102) and convert between such text messages in the global textsite platform syntax (e.g., navigating keywords) and the website map (139) for navigating a website document hierarchy of the website (138). For example, the mapping between such navigating keywords and the website map (139) may be contained in an adaptor plug-in for the website (138) where the navigating keywords are defined by the publisher of the adaptor plug-in.

In one or more embodiments of the invention, the agent (115) is configured to identify a web URL (i.e., used as website identifier in Universal Resource Locator format) in the user message as a request to access the website (138) hosted on the web server (136). Accordingly, the agent (115) is configured to activate the adaptor (120) for accessing the website (138) using the identified web URL via the Internet (126). The subsequent navigation of the website (138) may be essentially the same as described above.

In one or more embodiments of the invention, the textsite (118a), the textsite (128a), and/or the website (138) are configured to integrate contents from each other. In such embodiments, the textsite map (119), the textsite map (129), and/or the website map (139) are configured to include registered unique keywords (i.e., used as site identifiers) of other textsites and/or websites, which may be included in user text messages for redirecting the user mobile device (102) from one site (e.g., one of the textsite (118a), the textsite (128a), and the website (138)) to another during navigation of textsite content or converted website content.

In one or more embodiments of the invention, the aforementioned text messages exchanged between the user mobile device (102) and the global textsite platform (108), and more specifically between the user mobile device (102) and the agent (115), are of the same TMS protocol. Alternatively, text messages exchanged may include more than one TMS protocol. For example, the user messages may be SMS and the GTP messages may be MMS. Additional combinations are also possible in other examples.

Although the description above uses the user mobile device (102) in various example embodiments, those skilled in the art will appreciate that similar functionalities may be achieved by substituting the user mobile device (102) with the computing device (128). Further, the aforementioned redirecting functionality may be adapted to allow browsing of website (138) using the computing device (128) to be redirected to accessing a textsite (e.g., textsite (118a) or textsite (128a)) using the user mobile device (102) and vice-versa.

Although the GTP data (e.g., keywords, registry, textsite map, etc.) shown in FIG. 1B above are described in specific formats and organizations, those skilled in the art with the benefit of this disclosure will recognize that GTP data may be in other formats or organizations without deviating from the spirit of the invention.

Figure 2A:
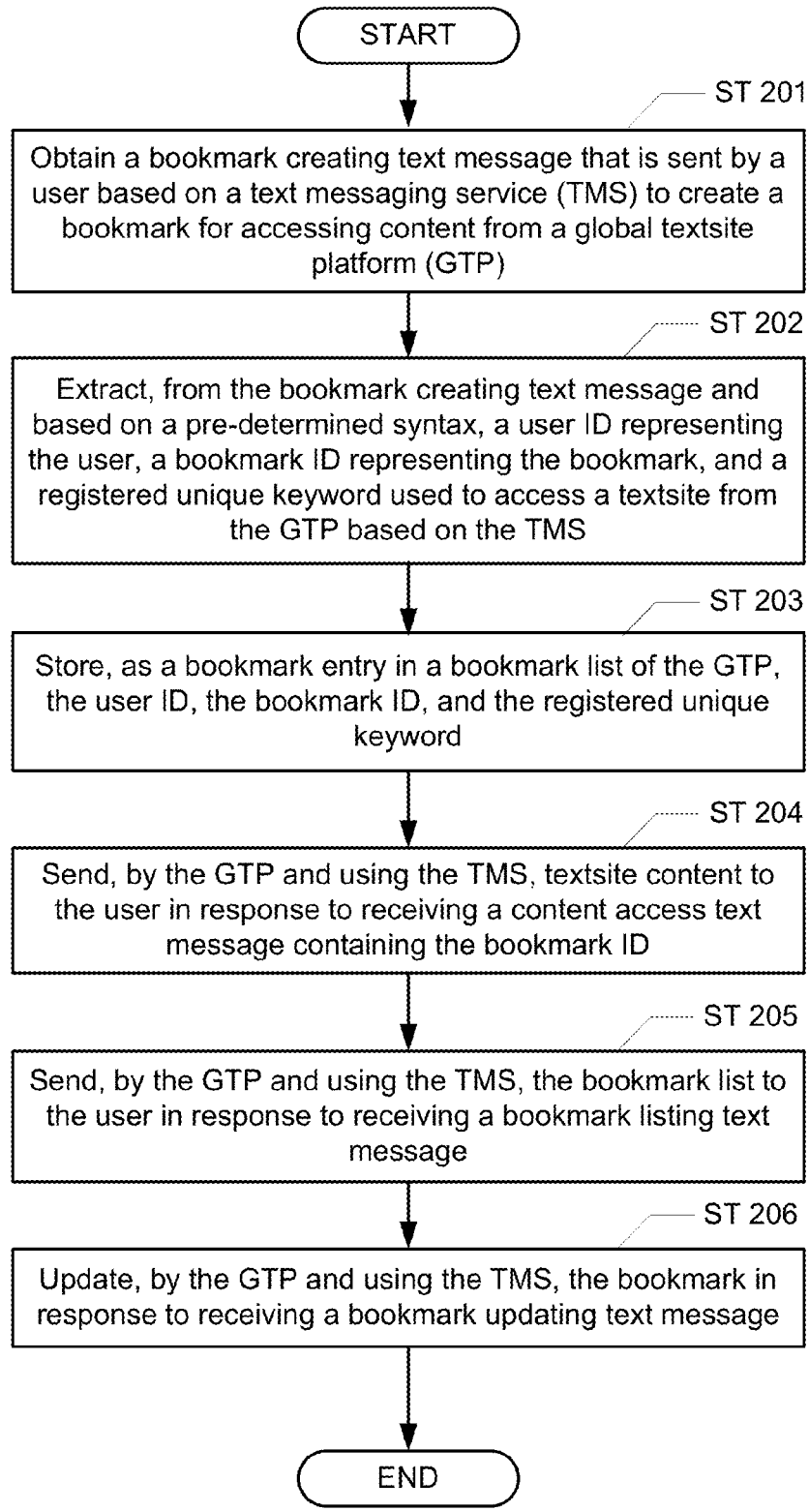
FIGS. 2A and 2B show flow charts of methods in accordance with one or more embodiments of the invention.

FIG. 2A shows a flow chart for personalized bookmarking of textsite applications of a text messaging service (TMS) based content platform in accordance with one or more embodiments of the invention. In one or more embodiments of the invention, the TMS based content platform may be the global textsite platform (GTP) described in reference to FIG. 1B above. In one or more embodiments of the invention, the method of FIG. 2A may be practiced using the system (100a)

described in reference to FIG. 1A above. In one or more embodiments of the invention, one or more of the steps shown in FIG. 2A may be omitted, repeated, and/or performed in a different order than that shown in FIG. 2A. Accordingly, the specific arrangement of steps shown in FIG. 2 should not be construed as limiting the scope of the invention.

Initially in Step 201, a bookmark creating text message is obtained. Specifically, the bookmark creating text message is based on the TMS and sent by a user to create a bookmark of the TMS based content platform. For example, the bookmark creating text message may be sent by the user via a mobile device of the user. In one or more embodiments, the TMS may include SMS, MMS, other text messaging service known to those skilled in the art, or any text messaging service that may be developed in the future. In one or more embodiments of the invention, the syntax used for a bookmark creating text message may be, for example, a text command having parameters "bookmark <bookmarkID> <application name>."

In Step 202, bookmarking parameters are extracted from the bookmark creating text message based on a pre-determined syntax. In one or more embodiments, the bookmarking parameters include a user ID representing the user, a bookmark ID representing the bookmark, and a registered unique keyword used to access a textsite from the GTP based on the TMS. In one or more embodiments, the user ID includes a mobile phone number or other identifier of the mobile device. In one or more embodiments, the method of using the registered unique keyword to access a textsite is described in reference to FIG. 2B below.

In Step 203, the user ID, the bookmark ID, and the registered unique keyword are stored as a bookmark entry in a bookmark list of the TMS based content platform (e.g., GTP). In one or more embodiments, the bookmark list may be a list, file, linked list, or other suitable data structure. For example, the bookmark entry may be indexed by the user ID and include the bookmark ID and the registered unique keyword as the entry content. In other words, the bookmark entry is a stored mapping that links the bookmark ID to the registered unique keyword of a textsite.

In Step 204, the bookmark ID is used by the user to access the textsite from the GTP. Specifically, the user requests the textsite content by sending to the GTP a content access text message. As noted above, the content access text message may specify the textsite by including a registered unique keyword or a bookmark ID representing the registered unique keyword. Once the content access text message is received by the GTP using the TMS, the GTP analyzes the content access text message by comparing to a registered unique keyword list. If any registered unique keyword is identified in the content access text message, the method depicted in FIG. 2B below is used to access the requested content. In one or more embodiments, the GTP further analyzes the content access text message by comparing to a bookmark list associated with the user. Specifically, the GTP analyzes the content access text message to detect the user ID contained therein indicating that the textsite access text message is sent by the user. For example, the user ID may be inserted in the header or the message body of the content access text message. In addition, the GTP further analyzes the content access text message by comparing it to the bookmark list associated with the user to determine that the content access text message also includes the bookmark ID. In other words, the GTP identifies a bookmark entry that is associated with the user ID and includes the bookmark ID. Accordingly, the GTP retrieves the registered unique keyword from the identified bookmark entry. Based on the registered unique keyword, the GTP then retrieves the requested content of the textsite for sending to the user using the TMS. In one or more embodiments, functionalities provided by the GTP based on the registered unique keyword to access requested content of the textsite are described in reference to FIG. 2B below.

At any time, a user may retrieve his/her bookmarks that have been set up and stored as bookmark entries. In Step 205, the bookmark list is sent to the user in response to a bookmark listing text message received by the GTP using the TMS. In particular, the bookmark listing text message is sent by the user to request the bookmark list from the GTP. In one or more embodiments, the bookmark listing text message includes a pre-determined keyword (e.g., the keyword "bookmark") that specifies the user request to obtain/view the bookmark list.

In Step 206, the bookmark list is updated in response to a bookmark updating text message received by the GTP using the TMS. In particular, the bookmark updating text message is sent by the user to update a bookmark entry in the bookmark list of the GTP. In one or more embodiments of the invention, there may exist a designated reserved bookmark character, such as '@', which may be used to recall the last message sent by the user to the GTP. This may be used, for example, when the user makes a typographical error in the bookmark creating message initially sent to the GTP.

In one or more embodiments, according to a pre-determined syntax, the bookmark updating text message re-assigns an existing bookmark ID to a different registered unique keyword (i.e., re-assigned registered unique keyword) instead of the previously assigned registered unique keyword. In other words, this bookmark ID is re-assigned to be used to access a different textsite (i.e., re-assigned textsite) instead of the previous textsite. In response to detecting this type of bookmark updating text message, the GTP extracts, from the bookmark updating text message and based on the pre-determined syntax, the user ID representing the user, the bookmark ID to be re-assigned, and the re-assigned registered unique keyword used to access the re-assigned textsite from the GTP based on the TMS. Accordingly, the GTP identifies the corresponding bookmark entry in the bookmark list based on the extracted user ID and bookmark ID, and inserts, in the identified bookmark entry, the re-assigned registered unique keyword to replace the existing registered unique keyword.

In one or more embodiments, according to a pre-determined syntax, the bookmark updating text message assigns an alternative bookmark ID to a registered unique keyword in addition to (or in place of) the existing bookmark ID previously assigned to the same registered unique keyword. In other words, the newly assigned bookmark ID is to be used, as an alternative to or a replacement of the previously assigned bookmark ID, to access the textsite identified by the registered unique keyword. In response to detecting this type of bookmark updating text message, the GTP extracts, from the bookmark updating text message and based on the pre-determined syntax, the user ID representing the user, the newly assigned bookmark ID, and the registered unique keyword. Accordingly, the GTP identifies the corresponding bookmark entry in the bookmark list based on the extracted user ID and registered unique keyword, and inserts, in the identified bookmark entry, the newly assigned bookmark ID to supplement or to replace the previously assigned bookmark ID.

Examples of using the method described above to designate a bookmark ID to represent the registered unique keyword and using the bookmark ID in place of the registered unique keyword to access corresponding textsite content, as well as reviewing/updating the bookmark list and the bookmark entry are described in reference to FIGS. 4A-4C below.

In one or more embodiments, once the registered unique keyword is identified directly from the content access text message or from the bookmark ID contained therein, the method of using the registered unique keyword to access the textsite is described in reference to FIG. 2B below. Further, an example method for accessing content of one or more textsites where personalized bookmarking may be used is described in reference to FIG. 2B below.

Figure 2B:
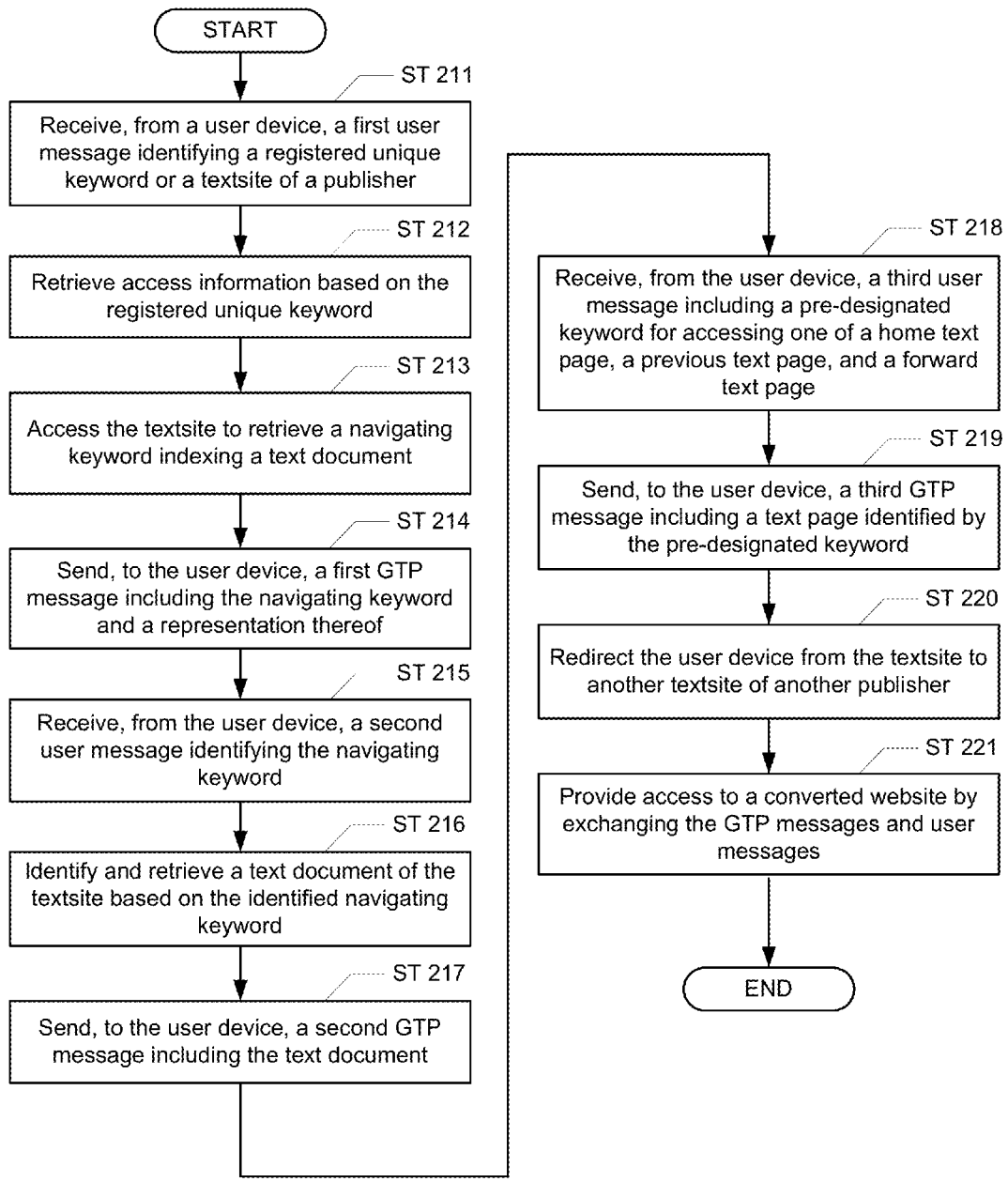

FIG. 2B shows a flow chart for accessing content of one or more textsites in accordance with one or more embodiments of the invention. More specifically, FIG. 2B shows a flow chart describing the process for accessing content from the global textsite platform (GTP) perspective, in which the platform provides users (i.e., users accessing content authored by publishers) with access to content maintained in the form of textsites by the GTP. In one or more embodiments of the invention, the method of FIG. 2B may be practiced using the GTP described in reference to FIG. 1B above. In one or more embodiments of the invention, one or more of the steps shown in FIG. 2B may be omitted, repeated, and/or performed in a different order than that shown in FIG. 2B. Accordingly, the specific arrangement of steps shown in FIG. 2B should not be construed as limiting the scope of the invention.

Initially in ST 211, a first user message is received, from a user mobile device that identifies a registered unique keyword maintained by the GTP. As described above, the registered unique keyword may be registered with the GTP by a publisher of a textsite identified by the registered unique keyword while the user device may be a mobile phone or other computing devices. By sending the registered unique keyword in the first user message, the user is requesting access to (i.e., to browse) the textsite associated with the registered unique keyword. In one or more embodiments of the invention, the GTP and/or the publisher may distribute an advertisement containing the registered unique keyword in a commercial promotion. Accordingly, the user may obtain the registered unique keyword from the advertisement. Alternatively, in one or more embodiments of the invention, the GTP may send, in response to receiving a request from the user device, a GTP message identifying a number of sample registered unique keywords from which the user may select a particular one to be included in the first user message. For example, the sample registered unique keywords may be registered with the GTP by a number of different publishers. In one or more embodiments, the request for a listing of registered unique keywords may be received from the user device in a second user message containing a pre-designated keyword defined specifically for requesting such a listing. Alternatively, in one or more embodiments, the user may request such a listing by simply making a conversationless call to the phone number of the GTP instead of sending the second user message to the same phone number. Using any of the approaches described above, the user may obtain a list of textsites accessible via the GTP using a single phone number (e.g., a local phone number) provided by the GTP according to a geographical location of the user. Accordingly, the user is not required to separately obtain and keep different phone numbers for accessing different textsites using a TMS.

In ST 212, authored content (e.g., access information) associated with the textsite requested by the user is retrieved based on the registered unique keyword extracted from the first user message received at the GTP. In one or more embodiments of the invention, the GTP maintains a registry containing an entry for each registered unique keyword that holds pertinent information of the textsite such as location, network address, access path, and other suitable metadata associated with the textsite. Accordingly, the access information associated with the user requested textsite may be retrieved. For example, such access information may determine whether the requested textsite is hosted on a server of the GTP or a third party server separate from the GTP.

In ST 213, the textsite is accessed based on the retrieved authored content (e.g., access information) to retrieve a navigating keyword. For example, a portion of the navigating keywords of the textsite may be retrieved. In another example, the navigating keyword may be retrieved by retrieving a home text page from the textsite that contains the navigating keyword. Generally speaking, the navigating keyword may be an alphanumeric string (e.g., location, Pita Wraps, Panini, Entrees, etc.) that is meaningful to the user but requires many keys to enter into the user device while the other navigating keyword may be a short string (e.g., loc, PW, P, E, 1, 2, 3, etc.) that is easy to enter but less meaningful to the user for selection. To assist the user in selecting a navigating keyword from a GTP message and to key in the selected navigating keyword when composing a reply user message, a cryptic navigating keyword (e.g., loc, PW, P, E, 1, 2, 3, etc.) may be associated with a meaningful label (e.g., location, Pita Wraps, Panini, Entry, etc.) and displayed together (e.g., loc>location, PW>Pita Wraps, P>Panini, E>Entrees, 1>location, 2>Pita Wraps, 3>Panini, etc.) in the text page delivered via the GTP message. Similarly, a meaningful navigating keyword (e.g., location, Pita Wraps, Panini, Entry, etc.) may be associated with a short hand identifier (e.g., loc, PW, P, E, 1, 2, 3, etc.) and displayed together (e.g., loc>location, PW>Pita Wraps, P>Panini, E>Entrees, 1>location, 2>Pita Wraps, 3>Panini, etc.) in the text page delivered via the GTP message. The meaningful label and the short hand identifier are referred to as a representation of the navigating keyword. In one or more embodiments, representations of the navigating keyword may also include formats different from the meaningful label and/or the short hand identifier.

In ST 214, a first GTP message containing the retrieved navigating keyword is sent to the user device in response to receiving the first user message. In one or more embodiments, the first GTP message includes the retrieved portion of the textsite navigating keywords. In one or more embodiments, the first GTP message includes the text page containing the retrieved navigating keyword. For example, the home text page of the textsite may be sent to the user device in the first GTP message as a reply to the first user message containing the registered unique keyword. Accordingly, the user may access a desired text page from the home text page by selecting a corresponding navigating keyword contained in the home text page. In one or more embodiments, a text page also contains, as defined by the publisher, representations of included navigating keywords for ease of user selection. For example, each of the navigating keywords in the home text page sent in the first GDP message may be accompanied by a meaningful label or a short hand identifier. Accordingly, the user may specify (or identify) a desired text page by including either a corresponding navigating keyword or a representation of such navigating keyword in a second user message replying to the first GTP message. In ST215, this second user message is received at the GTP.

As noted above, navigating keyword information (e.g., access information such as location, address, or other information enabling access to a text page pointed to by a navigating keyword) and navigation paths to text pages in the textsite are stored in the textsite map. In one or more embodiments of the invention, information regarding meaningful labels, short hand identifiers, or other keyword representations for a navigating keyword in a text page is also included in the textsite map. For example, such information includes the aforementioned dynamically assigned link and dynamically assigned keyword identifier described in reference to FIGS. 1A and 2A above. In ST 216, the desired text page is identified according to the textsite map based on either the navigating keyword or a representation (e.g., a meaningful label, short hand identifier) thereof extracted from the second user message. Further, the desired text page is retrieved by looking up access information in the textsite map accordingly.

In ST 217, the desired text page is included in a second GTP message and sent, as reply to the second user message, to the device for display to the user.

In ST 218, a third user message is received from the device while displaying the first text page. The third user message includes a pre-designated keyword (e.g., ",","0,"".," etc.). For example, the pre-designated keyword may be defined specifically for accessing a home text page of the textsite. In response, the GTP sends the home text page to the device in a third GTP message (ST 219). In another example, the pre-designated keyword may be defined specifically for accessing a previous text page sent to the device prior to the text page in a navigation trace. An example navigation trace is described with reference to FIGS. 3A-3J below. In response, the GTP sends the previous text page to the device in the third GTP message (ST 219). In still another example, the pre-designated keyword may be defined specifically for accessing a forward text page sent to the device subsequent to the text page in the navigation trace. In response, the GTP sends the forward text page to the device in a third GTP message (ST 219). In yet another example, the pre-designated keyword may be defined specifically for subscribing to updates of a currently displayed text page. In response, the GTP sends updated versions of the currently displayed text page in a push mode to the device from time to time in recurring GTP messages (ST 219).

While the description above regarding ST 211 through ST 219 relates to a textsite published by a publisher under a registered unique keyword, the user may obtain another registered unique keyword separately registered with the GTP by another publisher of another textsite. During navigation of the currently displayed textsite, a user message may be received identifying a second registered unique keyword. For example, such user message may include either the second registered unique keyword or a representation thereof. In response, the GTP redirects the user device from the currently navigated textsite to the second textsite (ST 220). Accordingly, the GTP may exchange text messages with the device for navigating the second textsite using a second set of navigating keywords according to a second textsite map of the second textsite. Accordingly, in one or more embodiments, the user may switch back and forth between different textsites published by different publishers without the need to change the phone number to which the text messages are sent in the middle of the textsite navigation.

As described above, there are several different approaches as to how a user may obtain a list of all textsites accessible via the GTP regardless of which publisher authored the content. An additional scenario in which the user may obtain additional registered unique keywords is from a text page having an embedded external link, as authored by the publisher and is consistent with the textsite map. In this scenario, a user message may be redirected to a second or third textsite as described above. Further, the text page may include a short hand identifier for the embedded external link in which case the user message may just include the short hand identifier for quick redirection.

In some scenarios, the second textsite described above is converted from a website, for example, using the adaptor described in reference to FIG. 1B above. In such scenarios, the second navigating keyword may be registered for the website where a corresponding registry entry specifies a particular adaptor plug-in for use to map between a website map of the website and a textsite map converted from the website map. Specifically, a navigating keyword received in a user message during navigation of the converted website is processed using the textsite map, the adaptor plug-in, and the website map to retrieve access information associated with a corresponding webpage. Subsequently, the webpage may be retrieved and converted dynamically (i.e., on demand) into a text page for sending to the user device. Alternatively, a pre-converted text page may be stored and retrieved for sending to the user device (ST 221).

Examples of screenshots detailing what a user text message and a response from the global textsite platform may look like are described in reference to FIGS. 3A-3J below.

FIGS. 3A, 3B, 3C, 3D, 3F, 3G, 3H, 3I, and 3J show various screenshots illustrating examples of accessing content hosted by a global textsite platform in one or more embodiments of the invention. Although FIGS. 3A, 3B, 3C, 3D, 3F, 3G, 3H, 3I, and 3J show implementation examples of embodiments of the invention, those skilled in the art will appreciate that there may be other ways in which to implement embodiments of the invention, and that the example screenshots are not meant to limit the scope of the invention. Throughout FIGS. 3A, 3B, 3C, 3D, 3F, 3G, 3H, 3I, and 3J, a text page delivered in a GTP message and the GTP message delivering the text page may both be referred to using the same reference numerals.

Figure 3A:
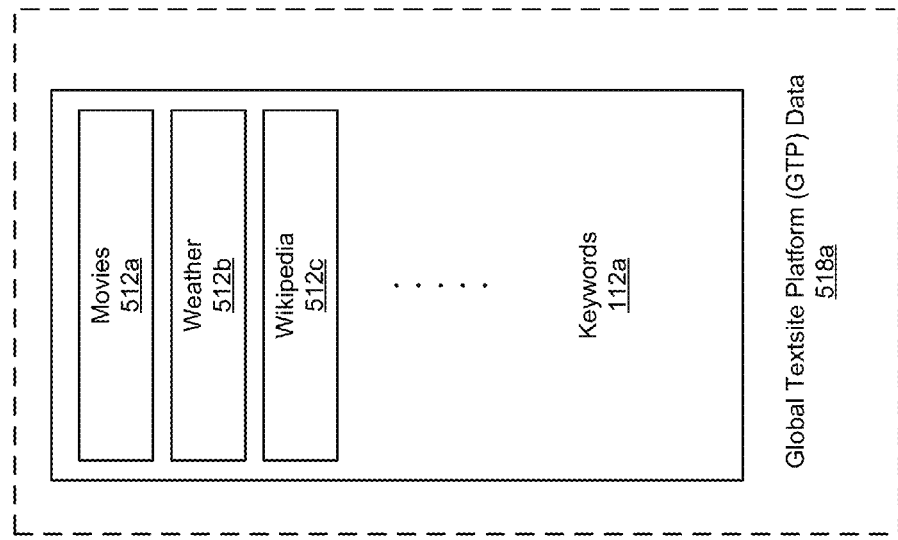
FIGS. 3A, 3B, 3C, 3D, 3F, 3G, 3H, 3I, and 3J show screenshots of an example in accordance with one or more embodiments of the invention.
Figure 3A:
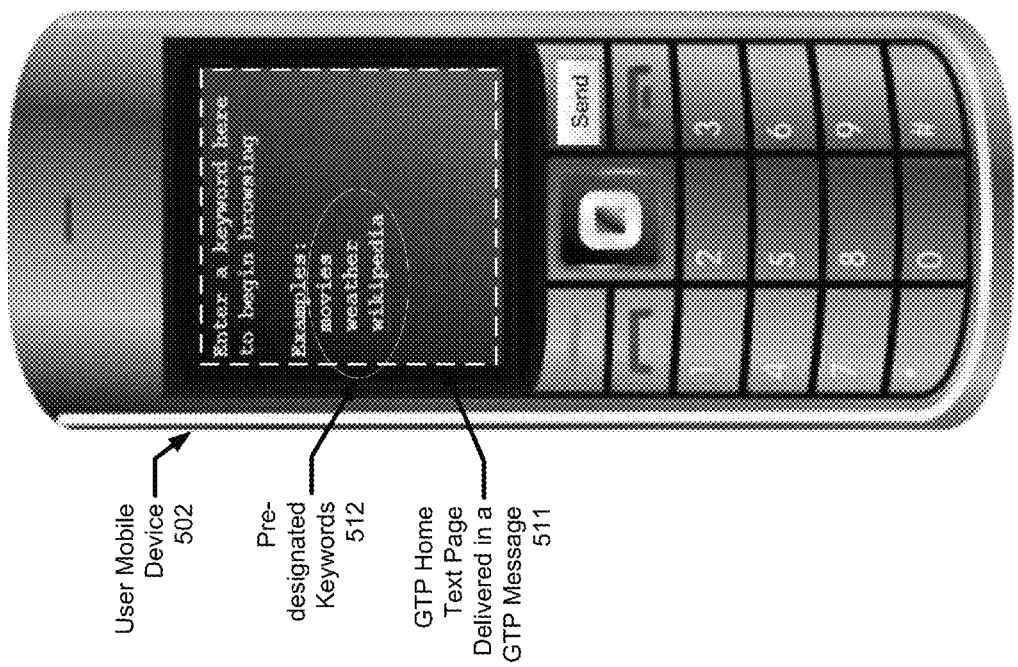

FIG. 3A shows the user mobile device (502) displaying an example GTP home text page, which is delivered via TMS in a GTP message (511). As noted above, this GTP home text page may be sent in the GTP message (511) in response to a request from a user. For example, the user may send a request message in a pre-designated format (e.g., with blank content or with content associated with another pre-designated keyword) using a phone number of the GTP to request the GTP home text page. In another example, the user may have made a conversationless telephone call to the phone number of the GTP to request the GTP home text page. As shown in FIG. 3A, the GTP home text page includes pre-designated keywords (512) listed as movies, weather, and Wikipedia. For example, these pre-designated keywords are stored in the keywords (112*a*) of GTP data (518*a*) corresponding to the keywords (112) shown in FIG. 1B above. The keywords (112*a*) includes pre-designated keyword entries of movies (512*a*), weather (512*b*), and Wikipedia (512*c*) corresponding to sample textsites or generic textsites included in and/or hosted by the GTP.

Figure 3B:
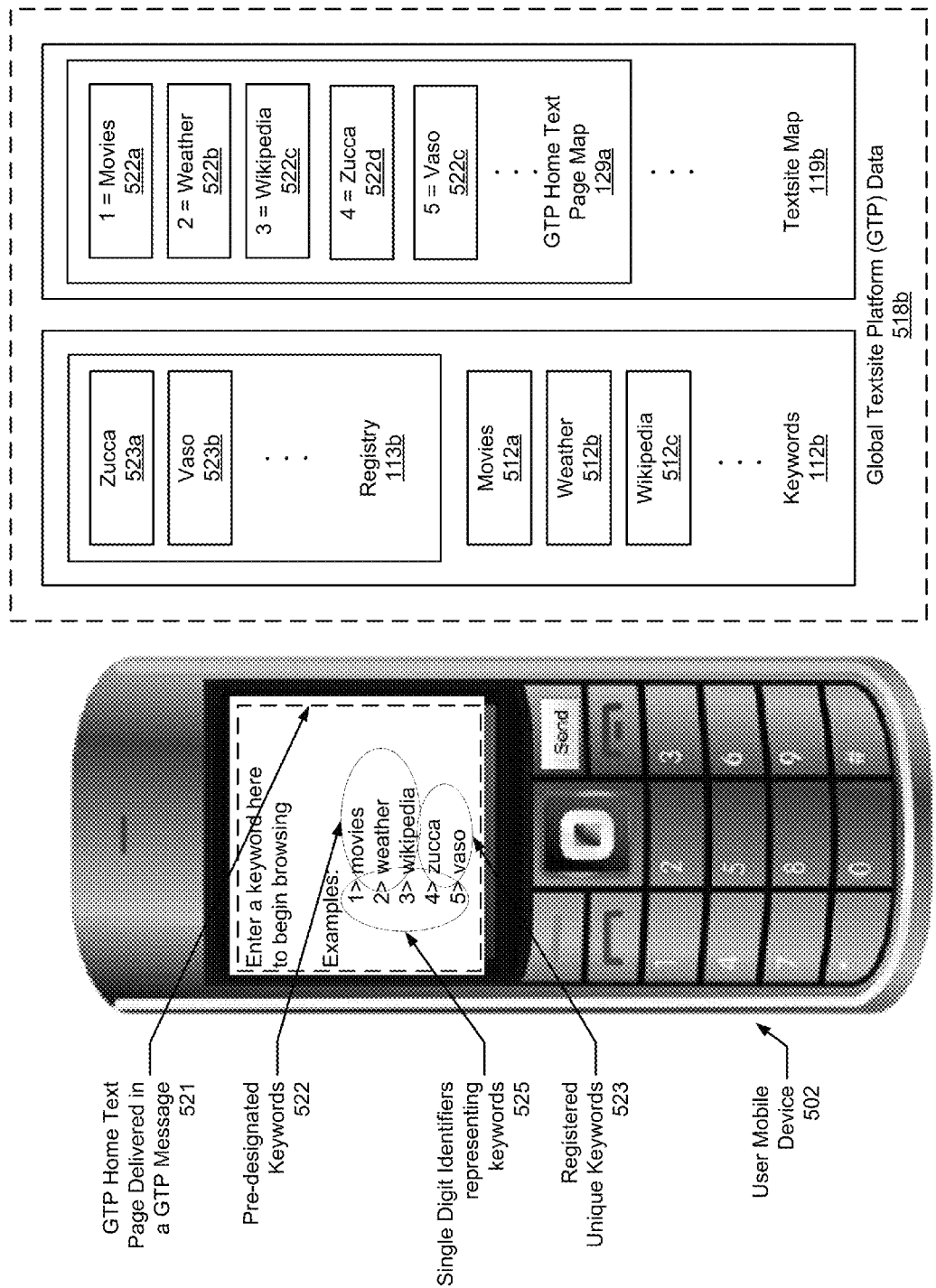

FIG. 3B shows the user mobile device (502) displaying another example GTP home text page delivered in a GTP message (521), which may be requested and delivered in essentially the same way as the example GTP home text page described in reference to FIG. 3A above. In the example GTP home text page shown in FIG. 3B, the pre-designated keywords (522) are essentially the same as the pre-designated keywords (512) described above while followed by registered unique keywords (523) listed as zucca and vaso. Accordingly, keywords (112*b*) of the GTP data (518*b*) include a registry (113*b*) in addition to the pre-designated keyword entries movies (512*a*), weather (512*b*), and wikipedia (512*c*). As shown, the registry (113*b*) includes keyword entries zucca (523*a*) and vaso (523*b*), which are linked to access information (not shown) to the respective textsites associated with those keywords.

Further as shown in FIG. 3B, short hand identifiers (525) (i.e., 1, 2, 3, 4, and 5) are displayed next to and represent pre-designated keywords (522) and registered unique keywords (523) for user selection in the example GTP home text page delivered in the GTP message (521). For example, zucca and vaso of the registered unique keywords (523) correspond to a restaurant textsite and a bookstore textsite, respectively. As described above, the user may include either the keyword "zucca" or the corresponding short hand identifier "4" when replying to the GTP message (521) to access the restaurant textsite. To facilitate this, a textsite map (119b) of the GTP data (518b) includes GTP home text page map (129a) containing entries (e.g., entry (522a) through entry (522e), etc.) for describing representations of the keywords using the short hand identifiers (525) and for describing access information authored for the respective textsites.

As described above, the registered unique keywords zucca and vaso may be registered with the GTP by the respective restaurant and bookstore owners who created their own textsites or registered by contracted publishers on their behalf. Further, the zucca textsite may be hosted on a server of the GTP while the vaso textsite may be hosted on a third party server separate from the GTP.

Figure 3F:
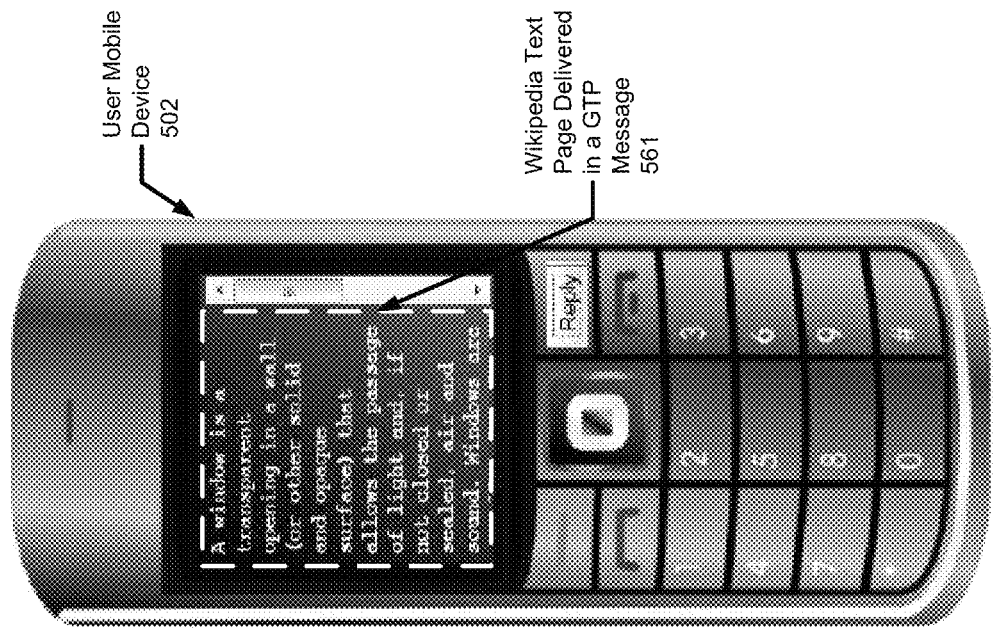
Figure 3C:
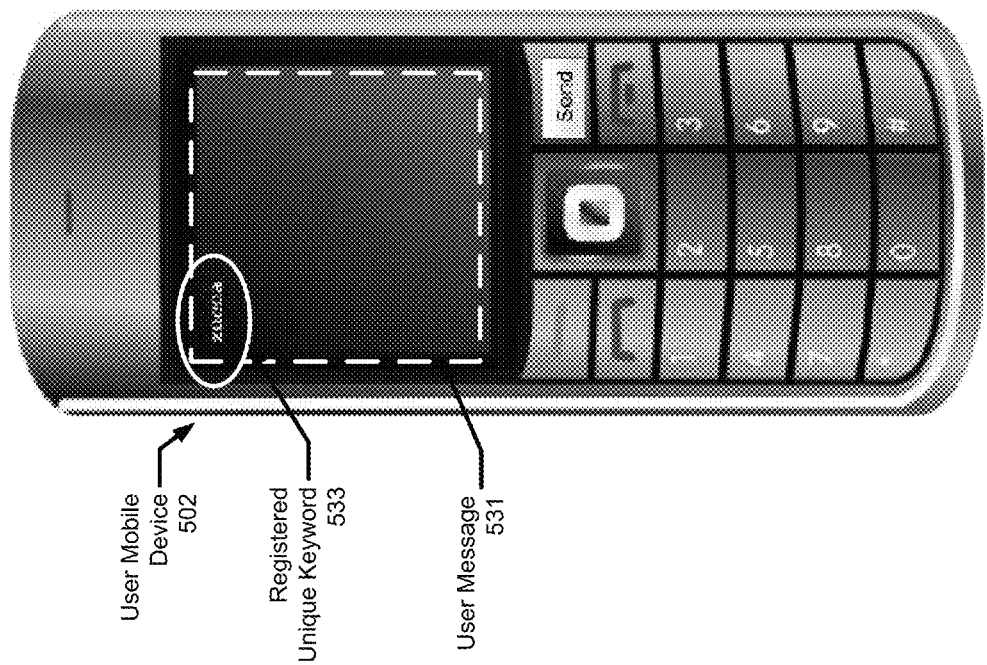

FIG. 3C shows the user mobile device (502) displaying an example user message (531) containing the registered unique keyword (533) (i.e., zucca) as selected by the user from the example GTP home text page shown in FIG. 3B above. Alternatively, the registered unique keyword (533) may be obtained by the user from an advertisement distributed, for example, by restaurant zucca in a commercial promotion.

Figure 3D:
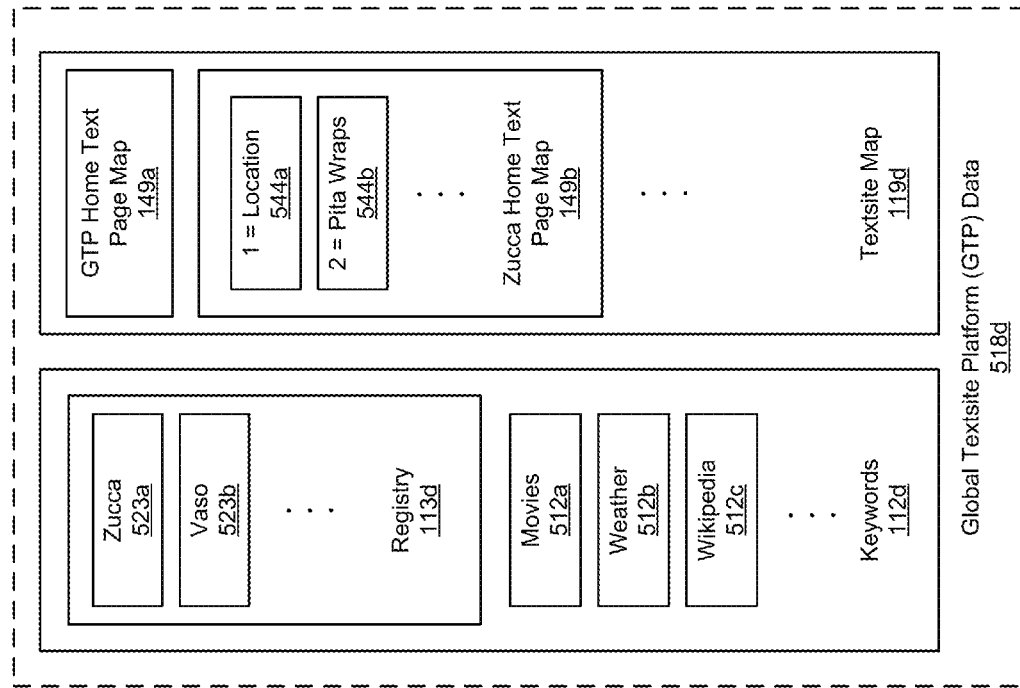
Figure 3D:
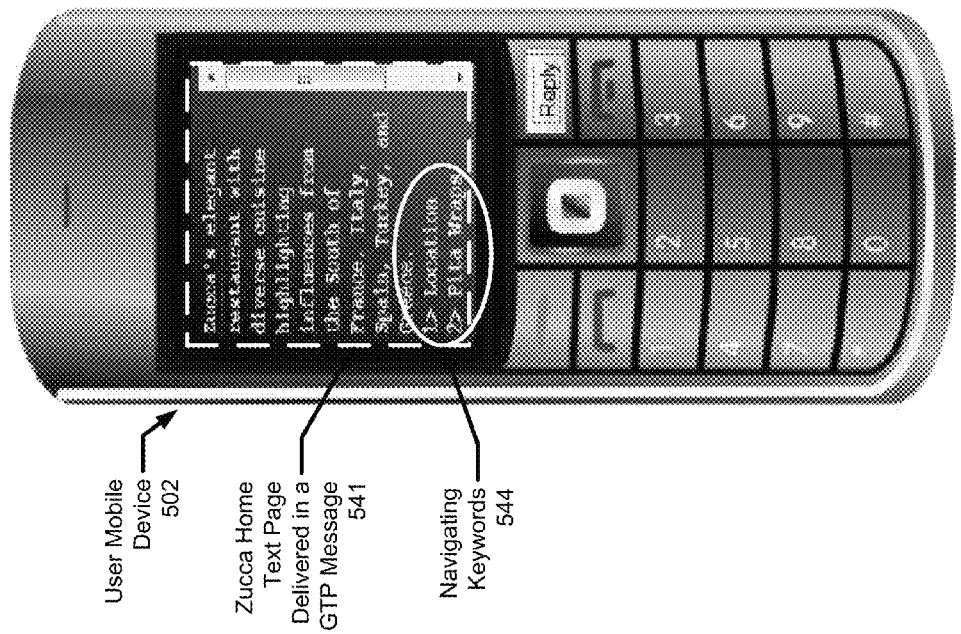

FIG. 3D shows the user mobile device (502) displaying an example home text page of the textsite for restaurant Zucca, which is delivered in a GTP message (541) in response to the user message (531) described above. As shown, the example zucca home text page includes navigating keywords and representations thereof (544) listed as "1>location" and "2>pita wraps." For example, "1" may be considered the navigating keyword while "location" is the meaningful label. Alternatively, "location" may be considered the navigating keyword while "1" is the short hand identifier. In either case, the aforementioned navigating keywords and representations thereof are displayed together for user selection in the zucca home text page. In the example shown in FIG. 3D, the GTP data (518d) is essentially the same as the GTP data (518b) shown in FIG. 3B above with an additional zucca home text page map (e.g., entry (544a), entry (544b), etc.) included in the textsite map (119d). For example, the GTP home text page map (149a) is essentially the same as the GTP home text page map (129a) shown in FIG. 3B above. As described above, the zucca home text page map (149b) contains entries for describing representations of the navigating keywords using the meaningful labels or short hand identifiers within the zucca home text page and for describing access information for respective text pages referenced by the navigating keywords. For example, including either the navigating keyword or the corresponding representation (i.e., either one of "location" or "1") in a user message replying to the GTP message (541) results in a text page containing address and driving direction information of the zucca restaurant being identified by the GTP. The address and driving direction information (i.e., the authored content for the text page associated with the navigating keyword (i.e., "location" or "1") is then delivered to the user mobile device (502) in a subsequent GTP message. As described above, the representation of navigating keywords (544) using meaningful labels or short hand identifiers and the use of navigating keywords (544) to index the respective text pages are applicable only within the displayed text page, which is the zucca home text page, in this instance. Said another way, and as illustrated in FIGS. 3G and 3H below, the keyword "location" or "1" may be associated with different effects when used in a context other than replying to a GTP message delivering the zucca home text page.

Figure 3E:
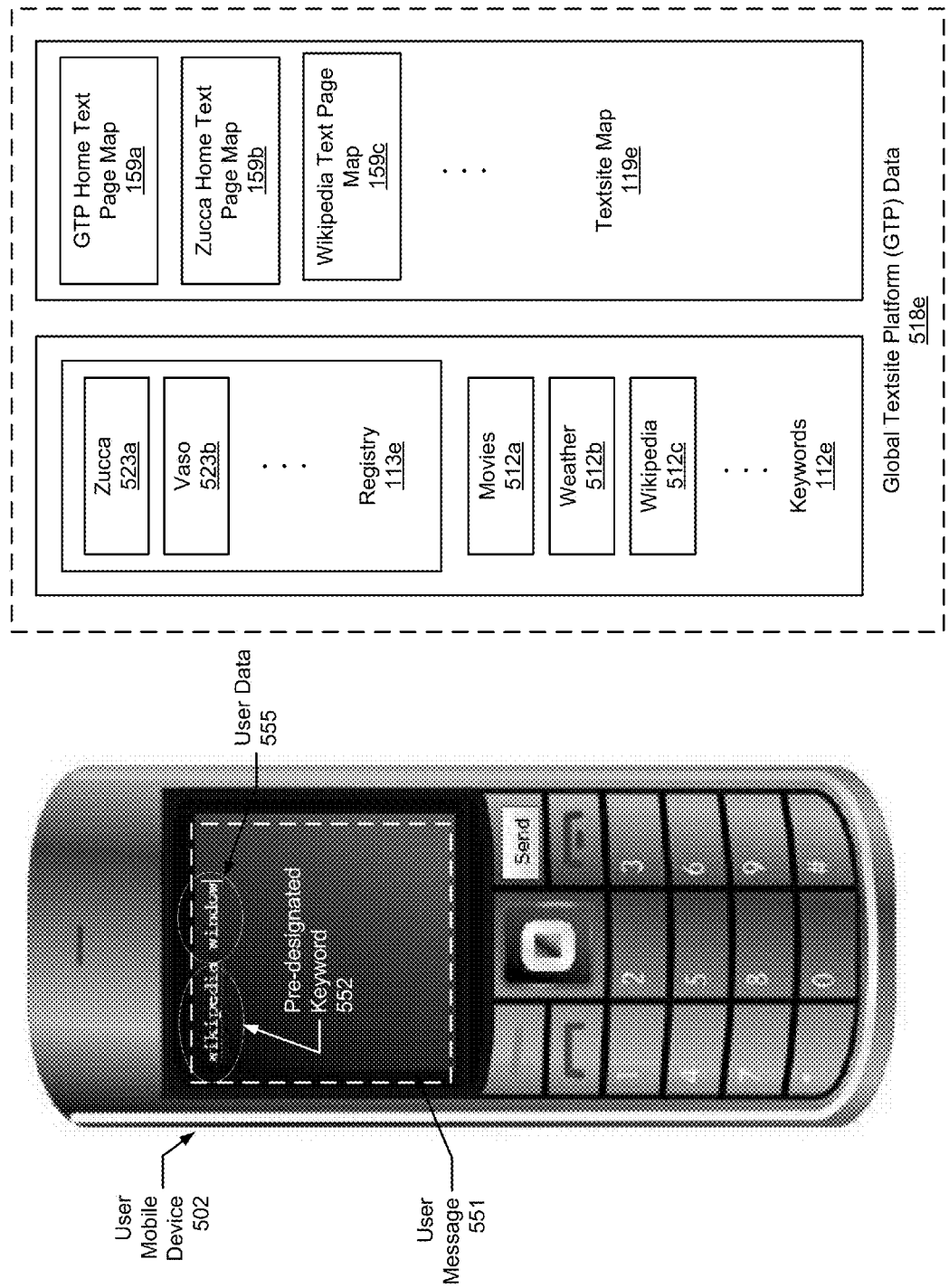

FIG. 3E shows the user mobile device (502) displaying an example user message (551) containing the pre-designated keyword (552) (i.e., Wikipedia) as selected by the user from the example GTP home text page shown in FIG. 3B above or otherwise obtained by the user from an advertisement distributed, for example, by an operator of the GTP promoting built-in features of the GTP. As shown in FIG. 3E, the pre-designated keyword (552) (i.e., Wikipedia) is followed by user data (555) (i.e., "window") in the user message (551) to initiate a search for information relating to user data (555) (i.e., "window") within the Wikipedia textsite. To facilitate this, textsite map (119e) of the GTP data (518e) includes Wikipedia text page map (159c) describing relevant syntax information applicable to the Wikipedia textsite. For example, the Wikipedia text page map (159c) may relate to a home text page or a text page other than the home text page of the Wikipedia textsite. The GTP home text page map (159a) and Zucca home text page map (159b) are essentially the same as the GTP home text page map (149a) and Zucca home text page map (149b) shown in FIG. 3D above.

FIG. 3F shows the user mobile device (502) displaying an example wikipedia text page delivered in a GTP message (561) responding to the user message (531) described above. As shown, the example wikipedia text page contains search result relating to the user data (555) (i.e., "window").

Figure 3G:
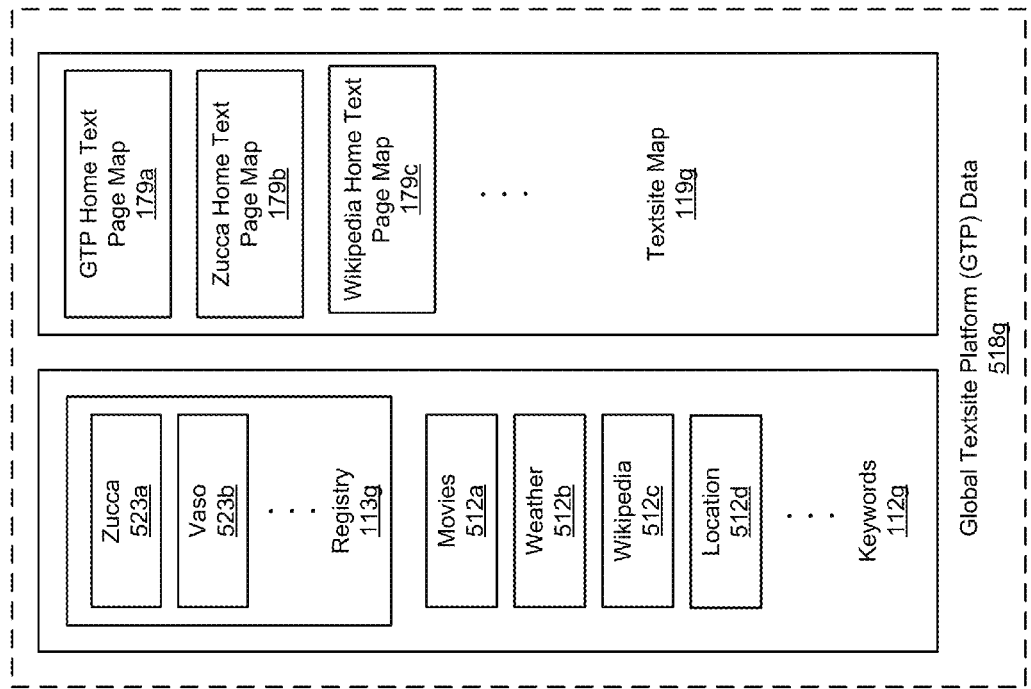
Figure 3G:
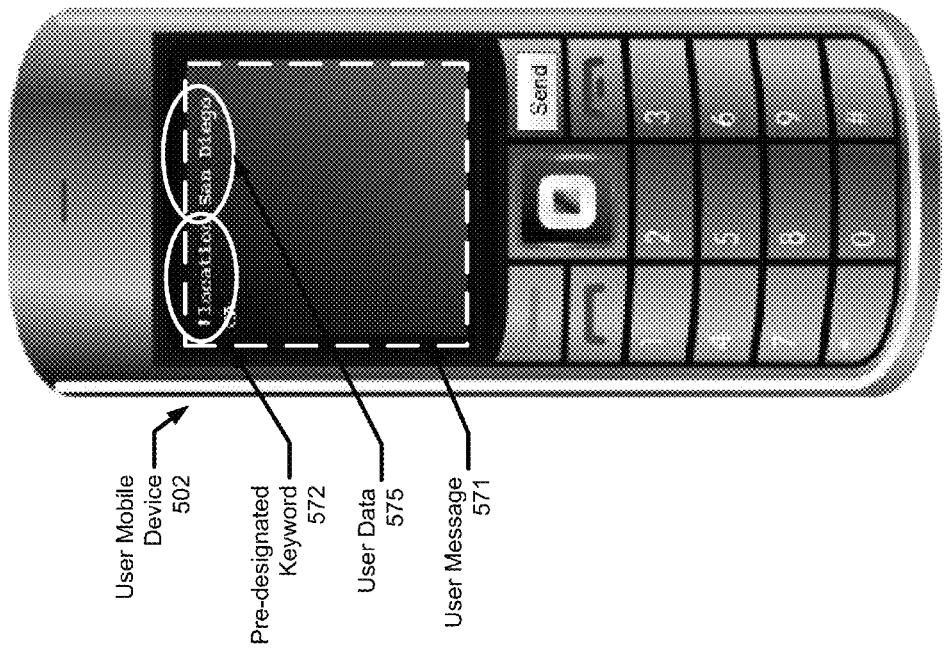
Figure 3H:
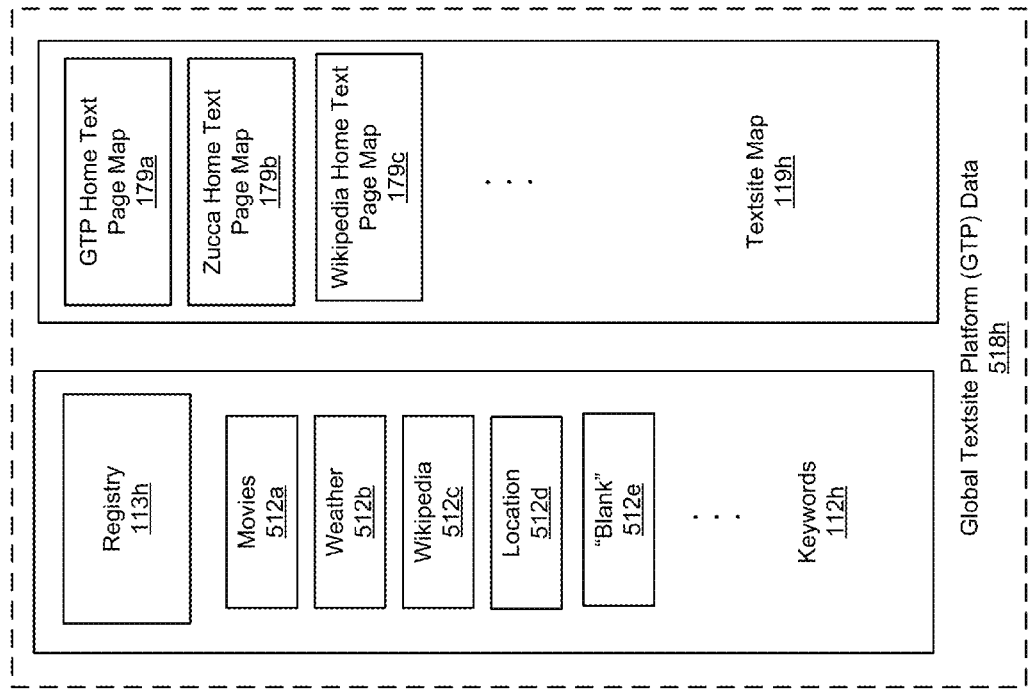
Figure 3H:
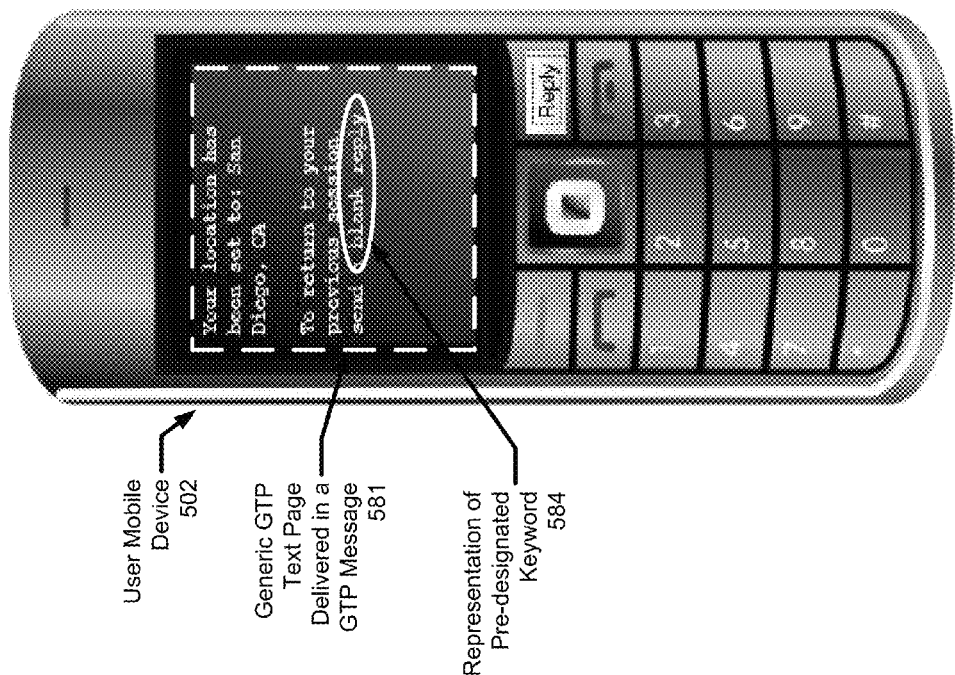

FIG. 3G shows the user mobile device (502) displaying an example user message (571) containing the pre-designated keyword (572) (i.e., location, as reflected by the entry location (512d) in keywords (112g) of the GTP data (518g)), for example obtained by the user in a GTP user guide (e.g., online user guide). As shown in FIG. 3E, the pre-designated keyword (572) (i.e., location) is followed by user data (575) (i.e., "San Diego") in the user message (571) to set a global user location parameter throughout the GTP. Accordingly, for example and as described in FIGS. 3I and 3J below, a textsite registered with the GTP may utilize this global user location parameter set by the user for performing related activities, such as searching for weather information associated with the user location reflected in this global user location parameter. In another example, the textsite may overwrite this global user location parameter by a locally defined location keyword, as described in FIG. 3D above. The GTP home text page map (179a), Zucca home text page map (179b), and Wikipedia home text page map (179c) are essentially the same as the GTP home text page map (159a), Zucca home text page map (159b), and Wikipedia home text page map (159c) shown in FIG. 3E above.

FIG. 3H shows the user mobile device (502) displaying an example GTP text page delivered in a GTP message (581) responding to the user message (571) described above. As shown, the example GTP text page contains confirmation to the user data (575) (i.e., "San Diego") and navigating tips describing a pre-designated keyword " " represented by the word "blank" (584) as reflected by the entry "blank" (512e) in keywords (112h) of the GTP data (518h). Based on the displayed navigating tips, the GTP may identify a previous session (e.g., a previous text page) from a user navigation trace for delivering to the user mobile device (502) upon receiving a user message containing the pre-designated keyword " " represented by the word "blank" (584). An example user navigation trace is the sequence of textsites traversed by the user as illustrated in FIGS. 3A through 3G above, which may be tracked by the GTP for assisting user textsite navigation. Other examples of pre-designated navigating keywords or syntax associated with the GTP may include a globally reserved single text digit (e.g., "0") or text string (e.g., ".") used for re-directing to a home page of the currently displayed textsite, a forward text page in the user navigation trace, or other pre-defined text pages. Similar to the use of the pre-designated keyword "location" (572), such pre-designated navigating keywords (e.g.,"," "0," ".," etc.) may be utilized or overwritten by a textsite based on syntax information defined in a corresponding textsite map by the publisher. The textsite map (119h) is essentially the same as the textsite map (119g) as shown in FIG. 3G above.

Figure 3J:
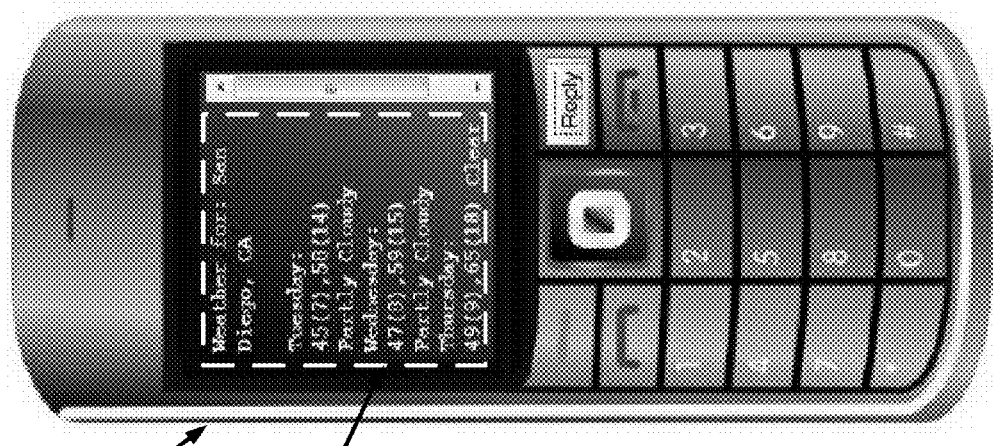
Figure 3I:
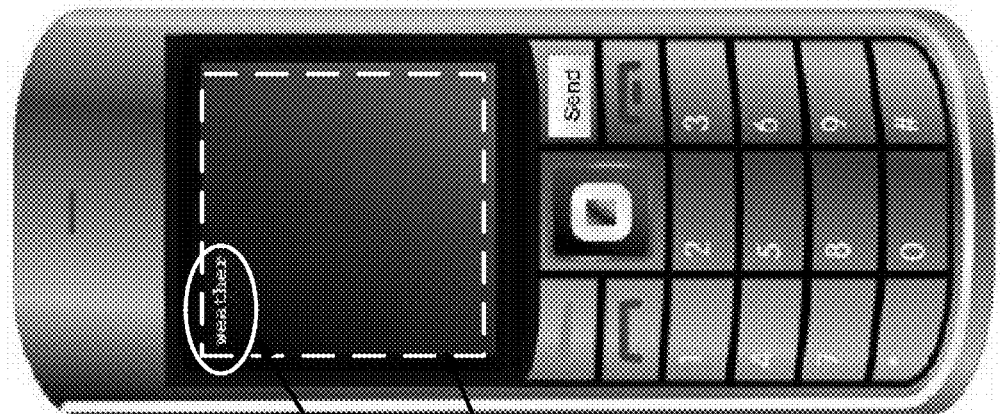

FIG. 3I shows the user mobile device (502) displaying an example user message (591) containing the pre-designated keyword (592) (i.e., weather) as selected by the user from the example GTP home text page shown in FIG. 3B above or otherwise obtained by the user from an advertisement distributed, for example, by an operator of the GTP promoting built-in features of the GTP.

FIG. 3J shows the user mobile device (502) displaying an example weather text page maintained by the GTP, which is delivered in a GTP message (593) in response to the user message (591) described above. As shown, the example weather text page illustrate a customized home text page for the weather textsite defined by the global user location parameter described in FIGS. 3G and 3H above.

Figure 4A:
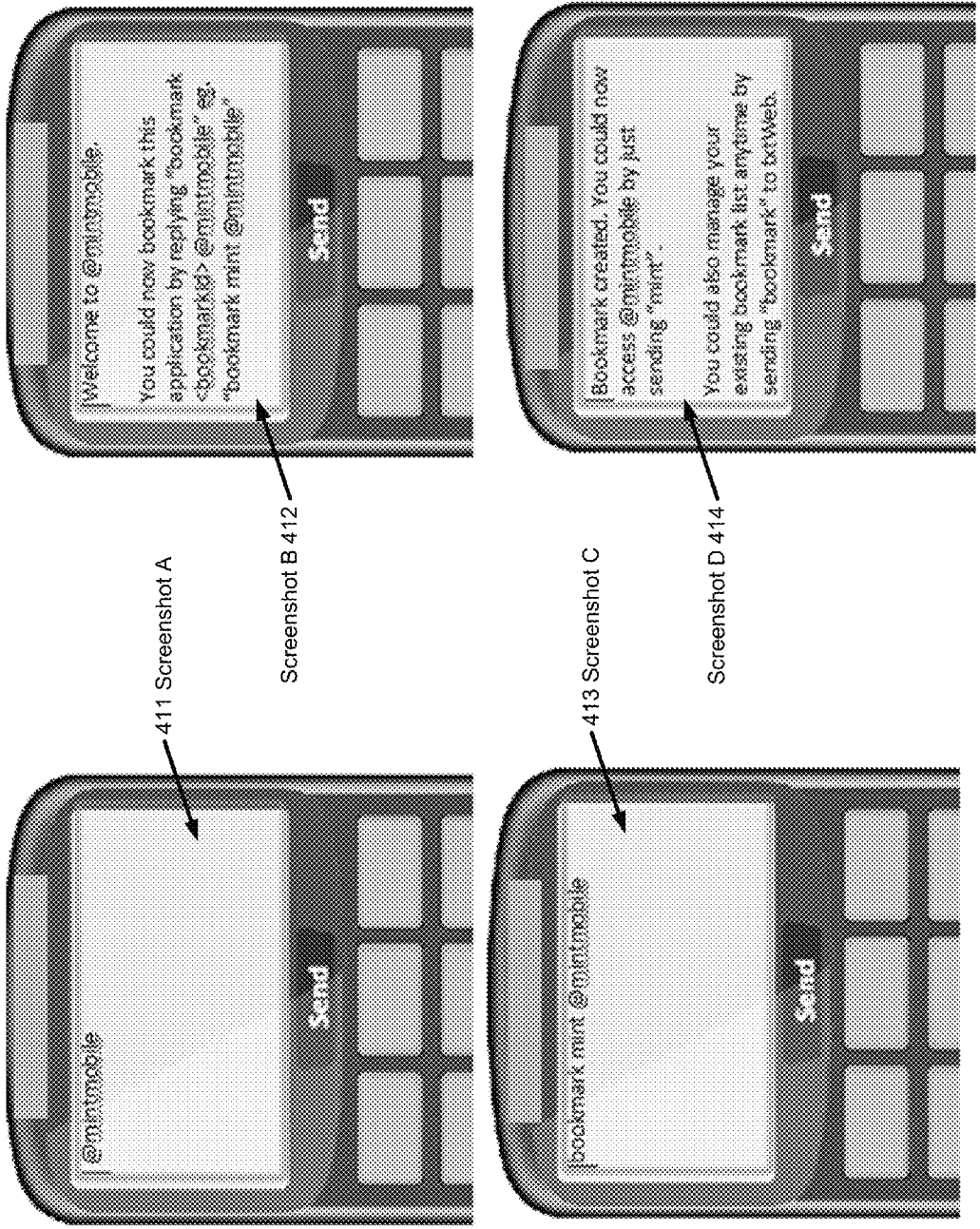
FIGS. 4A, 4B, and 4C show an example in accordance with one or more embodiments of the invention.
Figure 4B:
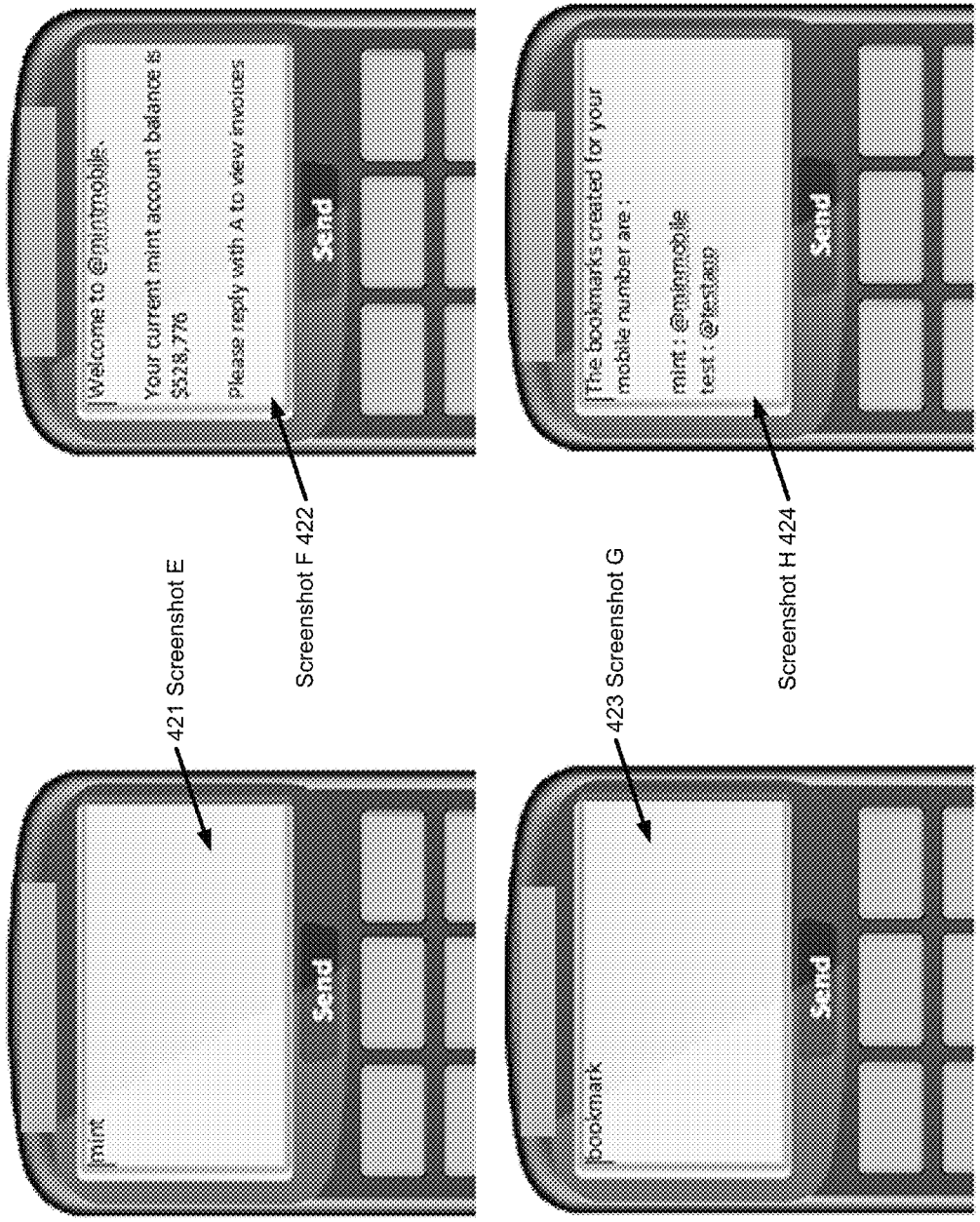
Figure 4C:
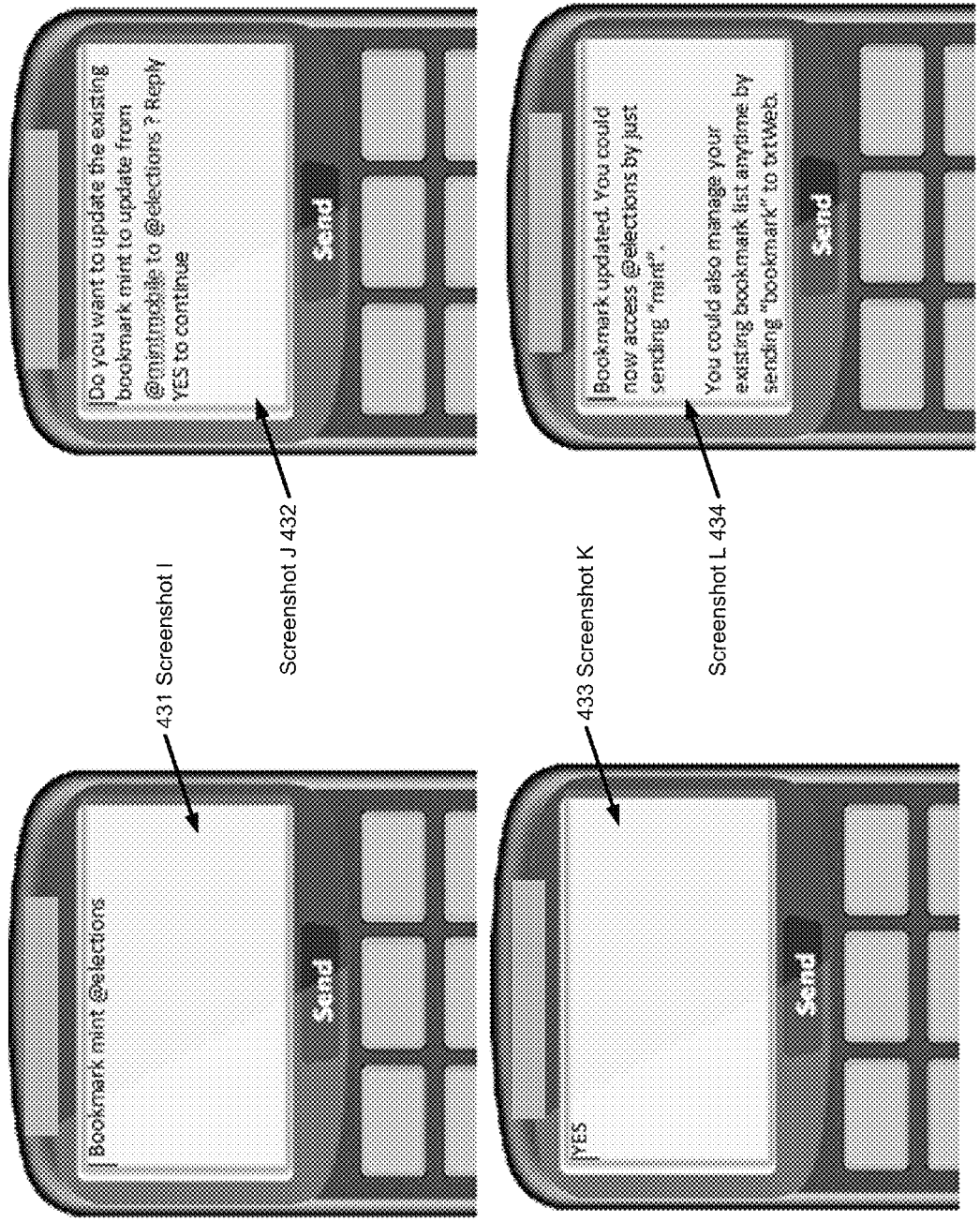

FIGS. 4A, 4B, and 4C show an example in accordance with one or more embodiments of the invention. Specifically, FIGS. 4A, 4B, and 4C show example screenshots of a user's cell phone illustrating personalized bookmarking of textsite applications via a text message. In particular, these example screenshots illustrate the bookmark application from a user's perspective in sending a bookmark text message, retrieving the bookmark text message, updating the bookmark IDs for most frequently used textsites, etc.

FIG. 4A shows example screenshot A (411) through screenshot D (414) illustrating creating a bookmark for the GTP application "@mintmobile." Specifically, the screenshot A (411) shows the application name "@mintmobile" that was typed as a text message by the user. The screenshot A (411) shows the application name "@mintmobile" that was typed as a text message by the user. Once this text message is sent to the GTP, a response text message is displayed, as shown in the screenshot B (412) to instruct the user how to create a bookmark for the application name "@mintmobile." Specifically, the user is instructed to send a reply text message in a particular format to create the bookmark. For example, the format is "bookmark [bookmark ID] [application name]." The screenshot C (413) shows the reply text message typed by the user according to this particular format. Specifically, the reply ext message assigns the text string "mint" as the bookmark ID for the application name "@mintmobile." Once this reply text message is sent to the GTP, another response text message is displayed, as shown in the screenshot D (414) to confirm that the bookmark for the application name "@mintmobile" is set up as "mint." In addition, it is indicated that the list of all existing bookmarks can be viewed by sending the text message "bookmark" to the GTP (referred to as "txtWeb" in the acknowledge message).

FIG. 4B shows example screenshot E (421) and screenshot F (422) illustrating using the bookmark for the GTP application "@mintmobile," as well as example screenshot G (423) and screenshot H (424) illustrating viewing the bookmark list of all existing bookmarks. In particular, this example is subsequent to the bookmark creation sequence depicted in FIG. 4A above. Specifically, the screenshot E (421) shows the bookmark "mint" that was typed as a text message by the user. Once this text message is sent to the GTP, a response text message including a home page of the textsite "@mintmobile" is displayed, as shown in the screenshot F (422). Because GTP recognizes that the textsite "@mintmobile" is accessed using the bookmark, this response text message does not include any instruction of how to create a bookmark for the textsite "@mintmobile."

Further as shown in FIG. 4B, the screenshot G (423) shows the keyword "bookmark" that was typed as a text message by the user. Once this text message is sent to the GTP, a response text message including a list of all existing bookmarks for the user is displayed, as shown in the screenshot H (424).

FIG. 4C shows example screenshot I (431) through screenshot L (434) illustrating updating an existing bookmark in the bookmark list. In particular, this example is subsequent to the bookmark creation sequence depicted in FIG. 4A above. Specifically, the screenshot I (431) shows a text message "bookmark mint @elections" typed by the user to assign the bookmark ID "mint" to a different application name "@elections" that would replace the currently assigned application name "@mintmobile." Once this text message is sent to the GTP, a response text message is displayed, as shown in the screenshot J (432) to request the user to confirm the bookmark reassignment. The screenshot K (433) shows the reply text message "yes" typed by the user to confirm the bookmark reassignment. Once this reply text message is sent to the GTP, another response text message is displayed, as shown in the screenshot L (434) to confirm that the bookmark "mint" is now reassigned to the application name "@election." Although the example shown in FIG. 4C relates to reassigning an existing bookmark ID from the currently assigned application name to a different application name, a similar procedure may be performed to assign a new bookmark ID to an application name already exists in the bookmark list. For example, this newly assigned bookmark ID may coexist with the previously assigned bookmark ID in the bookmark list for the same application name. In another example, this newly assigned bookmark ID may supersede the previously assigned bookmark ID in the bookmark list.

Although the description above generally refers to messages exchanged between the GTP and the user device as text messages transmitted via TMS, those skilled in the art with the benefit of this disclosure will appreciate that the invention is not intended to be limited to exchanges exclusively in text messages or using a TMS. For example, the GTP may provide functionalities to allow a user switching back and forth between browsing textsites via Internet using a computing device and navigating the textsites via telecommunication network using a mobile phone in a seamless fashion based on a single bookmark list.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for using a bookmark to access content from a global textsite platform (GTP), comprising:
    obtaining a bookmark creating text message, wherein the bookmark creating text message is based on a text messaging service (TMS) and sent by a user to create the bookmark;
    extracting, by a computer processor from the bookmark creating text message and based on a pre-determined syntax, a user ID representing the user, a first bookmark ID representing the bookmark, and a first registered unique keyword used to access a first textsite from the GTP based on the TMS; and
    storing, as a bookmark entry in a bookmark list of the GTP, the user ID, the first bookmark ID, and the first registered unique keyword,
    wherein the first bookmark ID is used by the user to access the first textsite from the GTP.

2. The method of claim 1,
    wherein the bookmark creating text message is sent by the user using a first device of the user,
    wherein the first textsite is accessed by the user using a second device of the user, and
    wherein the first device and the second device comprise a mobile device.

3. The method of claim 2,
    wherein the user ID comprises a mobile phone number of the mobile device.

4. The method of claim 1, further comprising:
    receiving, by the GTP using the TMS, a content access text message requesting content from the GTP;
    analyzing the content access text message to detect the user ID indicating that the textsite access text message is sent by the user;
    comparing the content access text message and the bookmark list to determine that the content access text message includes the first bookmark ID;
    retrieving, based on the user ID and the first bookmark ID, the first registered unique keyword from the bookmark entry in the bookmark list;
    retrieving, based on first registered unique keyword, content of the first textsite from the GTP; and
    sending, by the GTP and using the TMS, content of the first textsite to the user.

5. The method of claim 1, further comprising:
    receiving, by the GTP using the TMS, a bookmark listing text message requesting the bookmark list from the GTP; and
    sending, by the GTP and using the TMS, the bookmark list to the user in response to receiving the bookmark listing text message.

6. The method of claim 1, further comprising:
    obtaining a bookmark updating text message, wherein the bookmark updating text message is based on a text messaging service (TMS) and sent by the user to update the bookmark list;
    extracting, from the bookmark updating text message and based on the pre-determined syntax, the user ID representing the user, the first bookmark ID representing the bookmark, and a second registered unique keyword used to access a second textsite from the GTP based on the TMS;
    identifying the bookmark entry in the bookmark list based on the user ID and the first bookmark ID; and
    inserting, in the bookmark entry identified in the bookmark list, the second registered unique keyword to replace the first registered unique keyword,
    wherein the first bookmark ID is used by the user to access the second textsite from the GTP subsequent to the inserting.

7. The method of claim 1, further comprising:
    obtaining a bookmark updating text message, wherein the bookmark updating text message is based on a text messaging service (TMS) and sent by the user to update the bookmark list;
    extracting, from the bookmark updating text message and based on the pre-determined syntax, the user ID representing the user, a second bookmark ID further representing the bookmark, and the first registered unique keyword used to access the first textsite from the GTP based on the TMS;

identifying the bookmark entry in the bookmark list based on the user ID and the first registered unique keyword; and
inserting, in the bookmark entry identified in the bookmark list, the second bookmark ID to replace the first bookmark ID,
wherein the second bookmark ID is used by the user to access the first textsite from the GTP subsequent to the inserting.

8. The method of claim 1, further comprising:
obtaining a bookmark updating text message, wherein the bookmark updating text message is based on a text messaging service (TMS) and sent by the user to update the bookmark list;
extracting, from the bookmark updating text message and based on the pre-determined syntax, the user ID representing the user, the first bookmark ID representing the bookmark, and an instruction to delete the bookmark;
identifying the bookmark entry in the bookmark list based on the user ID and the first bookmark ID; and
deleting the bookmark entry in the bookmark list.

9. A system for using a bookmark to access content from a global textsite platform (GTP), comprising:
a processor;
memory storing instructions executable by the processor, wherein the instructions comprise:
a message analyzer configured to:
obtain a bookmark creating text message, wherein the bookmark creating text message is based on a text messaging service (TMS) and sent by a user to create the bookmark; and
extract, from the bookmark creating text message and based on a pre-determined syntax, a user ID representing the user, a first bookmark ID representing the bookmark, and a first registered unique keyword used to access a first textsite from the GTP based on the TMS;
a bookmark manager configured to:
store, as a bookmark entry in a bookmark list of the GTP, the user ID, the first bookmark ID, and the first registered unique keyword; and
a repository for storing the bookmark list,
wherein the first bookmark ID is used by the user to access the first textsite from the GTP.

10. The system of claim 9,
wherein the bookmark creating text message is sent by the user using a first device of the user,
wherein the first textsite is accessed by the user using a second device of the user, and
wherein the first device and the second device comprise a mobile device.

11. The system of claim 10,
wherein the user ID comprises a mobile phone number of the mobile device.

12. The system of claim 9, wherein the GTP is configured to:
receive, using the TMS, a content access text message requesting content from the GTP;
analyze the content access text message to detect the user ID indicating that the textsite access text message is sent by the user;
compare the content access text message and the bookmark list to determine that the content access text message includes the first bookmark ID;
retrieve, based on the user ID and the first bookmark ID, the first registered unique keyword from the bookmark entry in the bookmark list;
retrieve, based on first registered unique keyword, content of the first textsite; and
send, using the TMS, content of the first textsite to the user.

13. The system of claim 9, wherein the bookmark manager is further configured to:
receive, using the TMS, a bookmark listing text message requesting the bookmark list from the GTP; and
send, using the TMS, the bookmark list to the user in response to receiving the bookmark listing text message.

14. The system of claim 9,
wherein the message analyzer is further configured to:
obtain a bookmark updating text message, wherein the bookmark updating text message is based on a text messaging service (TMS) and sent by the user to update the bookmark list; and
extract, from the bookmark updating text message and based on the pre-determined syntax, the user ID representing the user, the first bookmark ID representing the bookmark, and a second registered unique keyword used to access a second textsite from the GTP based on the TMS,
wherein the bookmark manager is further configured to:
identify the bookmark entry in the bookmark list based on the user ID and the first bookmark ID; and
insert, in the bookmark entry identified in the bookmark list, the second registered unique keyword to replace the first registered unique keyword, and
wherein the first bookmark ID is used by the user to access the second textsite from the GTP subsequent to the inserting.

15. The system of claim 9,
wherein the message analyzer is further configured to:
obtain a bookmark updating text message, wherein the bookmark updating text message is based on a text messaging service (TMS) and sent by the user to update the bookmark list; and
extract, from the bookmark updating text message and based on the pre-determined syntax, the user ID representing the user, a second bookmark ID further representing the bookmark, and the first registered unique keyword used to access the first textsite from the GTP based on the TMS,
wherein the bookmark manager is further configured to:
identify the bookmark entry in the bookmark list based on the user ID and the first registered unique keyword; and
insert, in the bookmark entry identified in the bookmark list, the second bookmark ID to replace the first bookmark ID, and
wherein the second bookmark ID is used by the user to access the first textsite from the GTP subsequent to the inserting.

16. The system of claim 9,
wherein the message analyzer is further configured to:
obtain a bookmark updating text message, wherein the bookmark updating text message is based on a text messaging service (TMS) and sent by the user to update the bookmark list; and
extract, from the bookmark updating text message and based on the pre-determined syntax, the user ID representing the user, the first bookmark ID representing the bookmark, and an instruction to delete the bookmark;
wherein the bookmark manager is further configured to:
identify the bookmark entry in the bookmark list based on the user ID and the first bookmark ID; and
delete the bookmark entry in the bookmark list.

17. A non-transitory computer readable storage medium comprising software instructions for using a bookmark to access content from a global textsite platform (GTP), that when executed, comprise functionality for:
- obtaining a bookmark creating text message, wherein the bookmark creating text message is based on a text messaging service (TMS) and sent by a user to create the bookmark;
- extracting, from the bookmark creating text message and based on a pre-determined syntax, a user ID representing the user, a first bookmark ID representing the bookmark, and a first registered unique keyword used to access a first textsite from the GTP based on the TMS; and
- storing, as a bookmark entry in a bookmark list of the GTP, the user ID, the first bookmark ID, and the first registered unique keyword,
- wherein the first bookmark ID is used by the user to access the first textsite from the GTP.

18. The non-transitory computer readable medium of claim 17,
- wherein the bookmark creating text message is sent by the user using a first device of the user,
- wherein the first textsite is accessed by the user using a second device of the user, and
- wherein the first device and the second device comprise a mobile device.

19. The non-transitory computer readable medium of claim 18,
- wherein the user ID comprises a mobile phone number of the mobile device.

20. The non-transitory computer readable medium of claim 17, the software instructions when executed further comprise functionality for:
- receiving, by the GTP using the TMS, a content access text message requesting content from the GTP;
- analyzing the content access text message to detect the user ID indicating that the textsite access text message is sent by the user;
- comparing the content access text message and the bookmark list to determine that the content access text message includes the first bookmark ID;
- retrieving, based on the user ID and the first bookmark ID, the first registered unique keyword from the bookmark entry in the bookmark list;
- retrieving, based on first registered unique keyword, content of the first textsite from the GTP; and
- sending, by the GTP and using the TMS, content of the first textsite to the user.

21. The non-transitory computer readable medium of claim 17, the software instructions when executed further comprise functionality for:
- receiving, by the GTP using the TMS, a bookmark listing text message requesting the bookmark list from the GTP; and
- sending, by the GTP and using the TMS, the bookmark list to the user in response to receiving the bookmark listing text message.

22. The non-transitory computer readable medium of claim 17, the software instructions when executed further comprise functionality for:
- obtaining a bookmark updating text message, wherein the bookmark updating text message is based on a text messaging service (TMS) and sent by the user to update the bookmark list;
- extracting, from the bookmark updating text message and based on the pre-determined syntax, the user ID representing the user, the first bookmark ID representing the bookmark, and a second registered unique keyword used to access a second textsite from the GTP based on the TMS;
- identifying the bookmark entry in the bookmark list based on the user ID and the first bookmark ID; and
- inserting, in the bookmark entry identified in the bookmark list, the second registered unique keyword to replace the first registered unique keyword,
- wherein the first bookmark ID is used by the user to access the second textsite from the GTP subsequent to the inserting.

23. The non-transitory computer readable medium of claim 17, the software instructions when executed further comprise functionality for:
- obtaining a bookmark updating text message, wherein the bookmark updating text message is based on a text messaging service (TMS) and sent by the user to update the bookmark list;
- extracting, from the bookmark updating text message and based on the pre-determined syntax, the user ID representing the user, a second bookmark ID further representing the bookmark, and the first registered unique keyword used to access the first textsite from the GTP based on the TMS;
- identifying the bookmark entry in the bookmark list based on the user ID and the first registered unique keyword; and
- inserting, in the bookmark entry identified in the bookmark list, the second bookmark ID to replace the first bookmark ID,
- wherein the second bookmark ID is used by the user to access the first textsite from the GTP subsequent to the inserting.

24. The non-transitory computer readable medium of claim 17, the software instructions when executed further comprise functionality for:
- obtaining a bookmark updating text message, wherein the bookmark updating text message is based on a text messaging service (TMS) and sent by the user to update the bookmark list;
- extracting, from the bookmark updating text message and based on the pre-determined syntax, the user ID representing the user, the first bookmark ID representing the bookmark, and an instruction to delete the bookmark;
- identifying the bookmark entry in the bookmark list based on the user ID and the first bookmark ID; and
- deleting the bookmark entry in the bookmark list.

* * * * *